United States Patent
To et al.

(10) Patent No.: US 10,572,842 B1
(45) Date of Patent: Feb. 25, 2020

(54) NOTIFICATION SERVICE FOR MANAGING ACTIONABLE MESSAGES FROM BACKEND SERVICES

(71) Applicant: Amazon Technologies, Inc., Reno, NV (US)

(72) Inventors: Quan Binh To, Redmond, WA (US); Richard Curtis Edwards, Jr., Seattle, WA (US); Frederik Christophe Delacourt, Mercer Island, WA (US); Christopher Whitaker, Jr., Sammamish, WA (US); Julien Jacques Ellie, Issaquah, WA (US); Zachary Thomas Crowell, Redmond, WA (US); Benjamin David Newman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 653 days.

(21) Appl. No.: 14/538,717

(22) Filed: Nov. 11, 2014

(51) Int. Cl.
*G06Q 30/00* (2012.01)
*G06Q 10/06* (2012.01)
(Continued)

(52) U.S. Cl.
CPC ... *G06Q 10/063114* (2013.01); *G06Q 10/107* (2013.01); *G06Q 30/00* (2013.01); *H04L 51/24* (2013.01); *H04L 63/08* (2013.01)

(58) Field of Classification Search
CPC .......... G06Q 30/0255; G06Q 30/0235; G06Q 10/105; G06Q 10/103; G06Q 10/067;
(Continued)

(56) References Cited

U.S. PATENT DOCUMENTS 5,125,075 A 6/1992 Goodale et al.
8,874,621 B1 10/2014 Goodwin et al.
(Continued)

OTHER PUBLICATIONS

Burns et al., Harnessing Context Sensing to Develop a Mobile Intervention for Depression, Journal of Medical Internet Research, 2011. (Year: 2011).*

(Continued)

*Primary Examiner* — Amber A Misiaszek
*Assistant Examiner* — Uche Byrd
(74) *Attorney, Agent, or Firm* — Robert C. Kowert; Kowert, Hood, Munyon, Rankin & Goetzel, P.C.

(57) ABSTRACT

A service provider system may implement a notification service that manages actionable notification messages received from other services on behalf of a customer organization and its end users. An IT administrator of the customer organization may create and configure message inboxes to be maintained by the notification service. The messages stored in each inbox may be partitioned by source, type, targeted (authorized) recipients, or an associated message topic. Each message may include an identifier of the inbox to which it is directed, and active elements that, when selected by a recipient, cause a corresponding action to be performed. The service from which a message is received may, in response to a message recipient taking one of the available actions, submit a request to the notification service to update the message state. The notification service may provide APIs through which the other services and message recipients interact with the notification service.

20 Claims, 20 Drawing Sheets

(51) Int. Cl.
*H04L 12/58* (2006.01)
*H04L 29/06* (2006.01)
*G06Q 10/10* (2012.01)

(58) Field of Classification Search
CPC .. G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | |
|---|---|---|
| 2002/0152254 A1 | 10/2002 | Teng |
| 2003/0023675 A1 | 1/2003 | Ouchi et al. |
| 2003/0145276 A1 | 7/2003 | Hirata |
| 2003/0181991 A1 | 9/2003 | Chau et al. |
| 2004/0064472 A1 | 4/2004 | Oetringer et al. |
| 2004/0083448 A1 | 4/2004 | Schulz et al. |
| 2004/0205075 A1 | 10/2004 | LaTurner et al. |
| 2005/0021646 A1 | 1/2005 | Kumar |
| 2005/0043979 A1 | 2/2005 | Soares et al. |
| 2005/0251409 A1 | 11/2005 | Johnson et al. |
| 2006/0010221 A1* | 1/2006 | Srinivasan ............... F02D 19/10 709/206 |
| 2006/0122859 A1 | 6/2006 | Feldman et al. |
| 2006/0259524 A1 | 11/2006 | Horton |
| 2007/0092783 A1 | 4/2007 | Gibbons |
| 2007/0156428 A1 | 7/2007 | Brecht-Tillinger et al. |
| 2007/0179790 A1 | 8/2007 | Leitch et al. |
| 2008/0033871 A1* | 2/2008 | Birbara ................... G06Q 20/10 705/39 |
| 2008/0133748 A1 | 6/2008 | Nicholas |
| 2008/0301699 A1 | 12/2008 | Macer |
| 2009/0204897 A1 | 8/2009 | Sogge et al. |
| 2009/0281865 A1 | 11/2009 | Stoitsev |
| 2010/0048222 A1* | 2/2010 | Gracieux ............... H04L 63/107 455/456.1 |
| 2010/0287104 A1 | 11/2010 | Leroy |
| 2010/0306011 A1 | 12/2010 | Correll et al. |
| 2012/0307656 A1* | 12/2012 | Vyrros ................ H04L 12/1859 370/252 |
| 2013/0124638 A1 | 5/2013 | Barreto et al. |
| 2013/0268936 A1 | 10/2013 | Hsu et al. |
| 2013/0318589 A1 | 11/2013 | Ford et al. |
| 2014/0052643 A1 | 2/2014 | Baldwin et al. |
| 2014/0180938 A1 | 6/2014 | Domke et al. |
| 2014/0273978 A1 | 9/2014 | Van Snellenberg |
| 2014/0279569 A1 | 9/2014 | Baldwin et al. |
| 2014/0282084 A1 | 9/2014 | Murarka et al. |
| 2015/0095092 A1 | 4/2015 | Medikundam et al. |
| 2015/0212674 A1* | 7/2015 | Firstenberg ........... G06F 3/0484 715/747 |

OTHER PUBLICATIONS

U.S. Appl. No. 14/577,161, filed Dec. 19, 2014, Frederik Christophe Delacourt.

"Apple Announces iOS 8 Available Sep. 17", Apple Press Info, Sep. 9, 2014, pp. 1-3.

* cited by examiner

NOTIFICATION SERVICE FOR MANAGING ACTIONABLE MESSAGES FROM BACKEND SERVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

Managers and other authority figures within companies and other organizations often send messages to their members that include to perform tasks using emails or text messaging. However, once the emails or text messages are sent, the sender does not have any control over them, nor any mechanism for determining whether or not the instructions were followed. In some cases, if there are multiple acceptable actions that an organization member can take in response to such a message, the sender might like to know which of these actions, if any were taken. In some cases, if an email or text message that includes instructions to perform a task is sent to multiple people (e.g., all of the members of a department or project team), the sender will typically not have any control over, or knowledge of, which, if any, of the recipients actually read the email or text message and/or perform the task. Therefore, in an organization in which many such emails or text messages are exchanged between the members of the organization, keeping track of what has or has not been done (much less by whom) can be difficult and error-prone. In addition, this approach can easily lead to an important task going unperformed while each member of the organization that received the message assumes that another member will perform the task.

Figure 1:
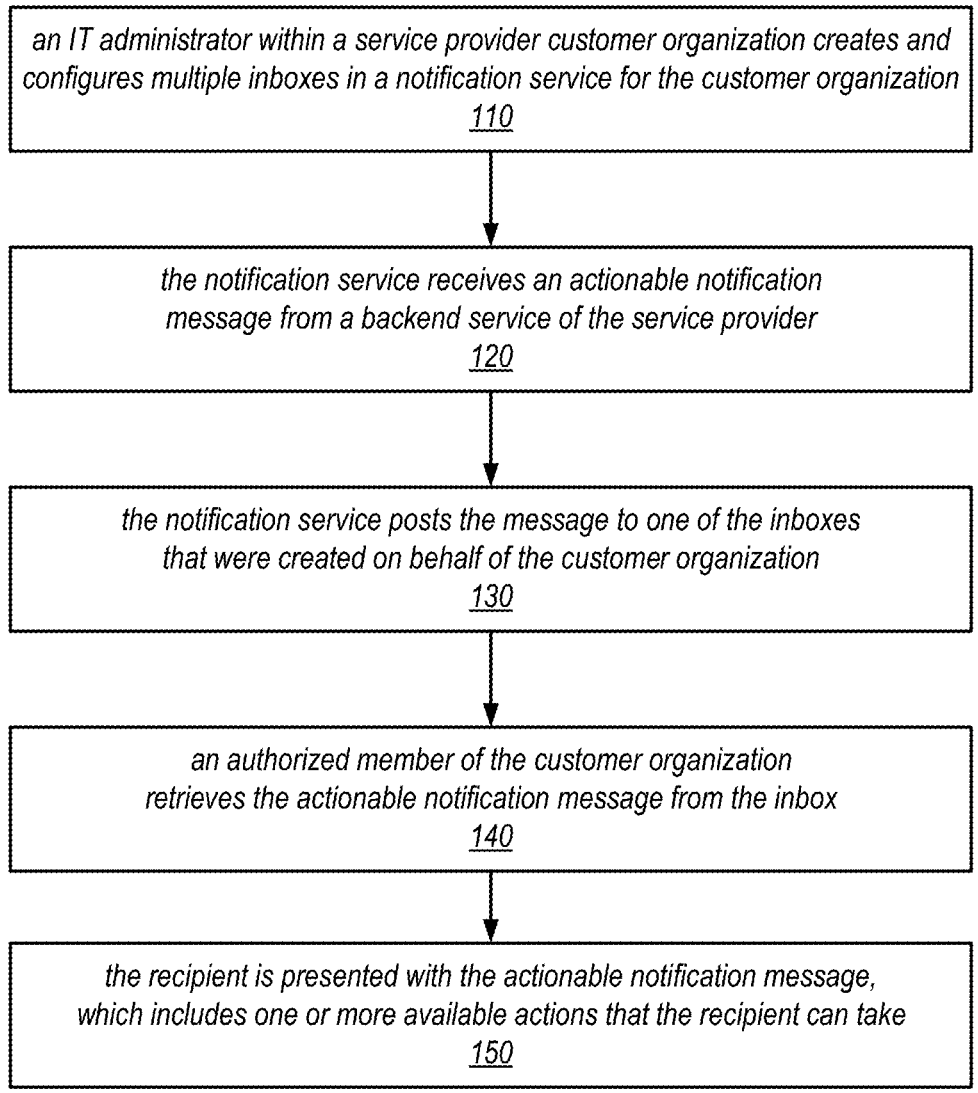
FIG. 1 is a flow diagram illustrating one embodiment of a method for utilizing a notification service to manage actionable notification messages from backend service of a service provider

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement a notification service that handles actionable notification messages on behalf of other services. For example, the notification service (which may sometimes be referred to herein as an "inbox service") may allow various service provider services to send targeted, actionable messages to service consumers (e.g., administrators or end users within a service provider customer organization). The notification service may define the notion of an "inbox" (e.g., an inbox defined and/or created by a customer or service) as a target for such messages. The inbox service may allow administrators to define who has access to various messages and where notifications are sent when messages arrive in a particular inbox.

As described in more detail herein, in some embodiments, access to an inbox that was created on behalf of a customer may be managed by that customer via identity and access management (IAM) policies (e.g., based directly on their IAM users and roles and/or as defined by a resource-level policy on the inbox itself). The other services (e.g., services that are, essentially, clients or "customers" of the notification service) may have the ability to create and manage actionable notification messages through the notification service and may be responsible for managing the lifecycle of the actionable notification messages they create. For example, a service that creates an actionable notification message (which may sometimes be referred to herein as a "backend service") may be responsible for determining the state of the actionable notification message, determining when it the actionable notification message is no longer relevant, when it can be designated as "inactive" and/or when it can be deleted. The backend service may send updates to the notification service to indicate these and other state changes for the actionable notification messages it created.

The notification services described herein may, in different embodiments, receive, store, and dispatch actionable notification messages that are received from any of a variety of backend services that are configured to interoperate with the notification service, e.g., any backend services that employ an application programming interface defined by the notification service for submitting actionable notification messages, updated state information for actionable notification messages, or other service requests related to the creation and management of one or more message inboxes on behalf of a customer. For example, an enterprise catalog service that provides a stream of change events for a product (such as when a new version of the product becomes available) may employ the techniques described herein to listen for these events and to target actionable notification messages to the specific set of end users that are using older versions of the product using a notification service such as those described herein. In this example, and in other backend services that are configured to interoperate with the notification service to manage actionable notification messages, the backend service may include a notification engine to inform users when a system event happens or when an action is required. The notification engine of the backend service may determine which users (and thus which of multiple message inboxes) to target and may associate an actionable item to a notification message that is dependent on the users' roles. For example, the roles of the users to whom an actionable notification message is directed may be that of developers, administrators, approvers, or any other roles defined by the customer. The actions associated with the roles may be determined by the permissions granted to the role (e.g., by an IT administrator). In some embodiments, by employing the notification services and techniques described herein, a user to whom a notification message is targeted may be presented with a logical set of actions to take, and those actions may be performed automatically in response to their selection by the user. In some embodiments, once an action selected by the user has been performed, the backend service from which the actionable notification message originated may update its state with the notification service.

One embodiment of a method for utilizing a notification service to manage actionable notification messages from backend service of a service provider is illustrated by the flow diagram in FIG. 1. As illustrated at 110, in this example, the method may include an IT administrator within a service provider customer organization creating and configuring multiple inboxes within a notification service for the customer organization. The method may also include the notification service receiving an actionable notification message from a backend service of the service provider.

As illustrated in this example, the method may include the notification service posting the message to one of the inboxes that were created on behalf of the customer organization for subsequent retrieval by a member of the customer organization, as in 130. The method may also include an authorized member of the customer organization retrieving the actionable notification message from the inbox, as in 140. The method may also include presenting the actionable notification message (which includes one or more available actions that the recipient can take) to the member of the customer organization who retrieved the message, as in 150.

Figure 2:
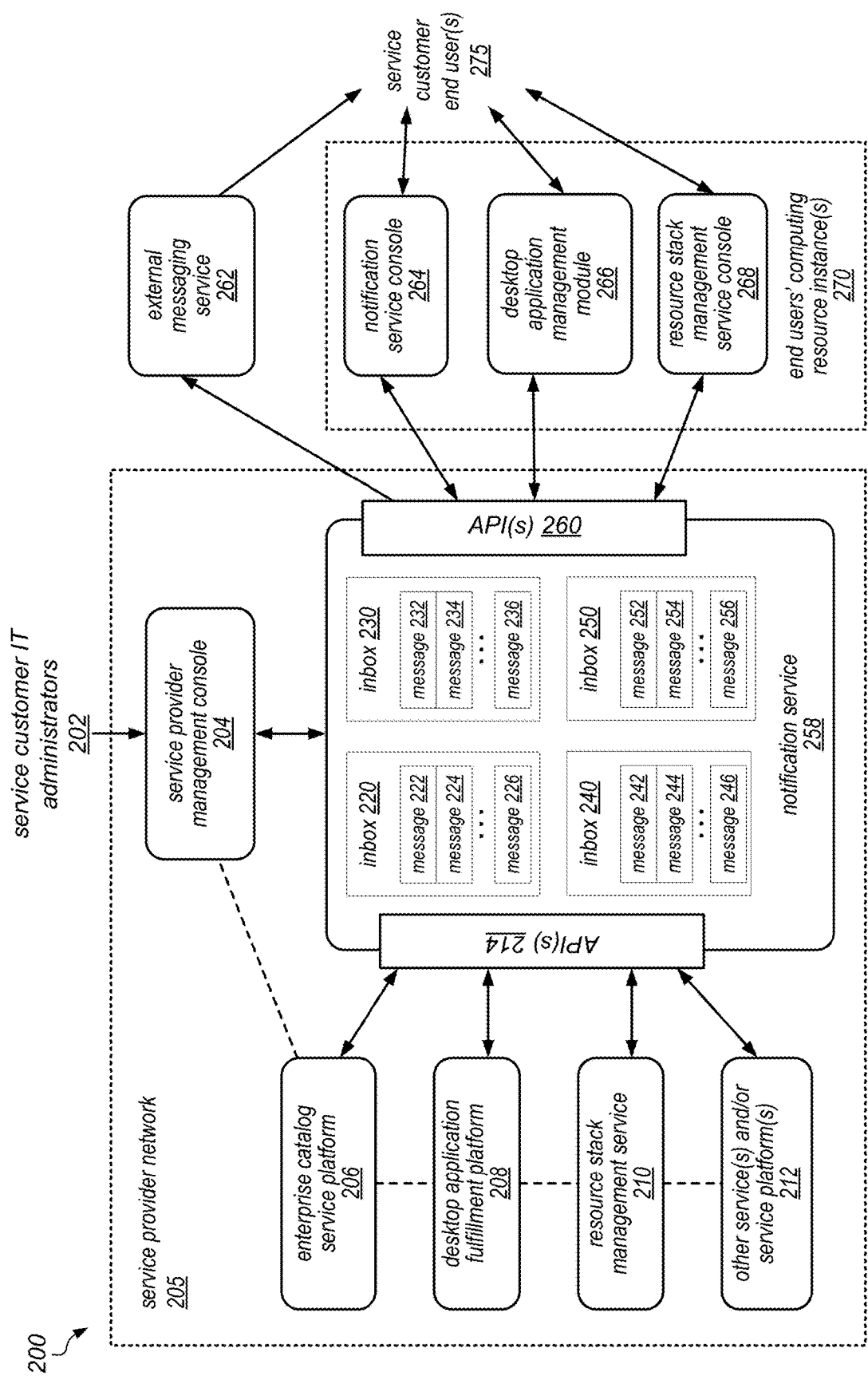
FIG. 2 is a block diagram illustrating one embodiment of a service provider system that is configured to implement a notification service that manages actionable notification messages on behalf of backend services of the service provider.

One embodiment of a service provider system that is configured to implement a notification service that manages actionable notification messages on behalf of backend services of the service provider is illustrated by the block diagram in FIG. 2 In this example, system 200 includes, on a service provider network 205, physical and/or virtualized computing resources that are configured to provide a variety of services for the IT administrators, buyers, and/or end users within a service provider customer (e.g., various members of a service provider customer organization). System 200 also includes client-side components of at least some of these platforms and services that are implemented on various end users' computing resource instances 270 (which may include physical computing devices and/or virtualized computing resource instances, some of which may be hosted on physical resources on service provider network 205—not shown). In this example, servicer provider network 205 includes an enterprise catalog system platform 206, a desktop application fulfillment platform 208, a resources stack management service 210, and one or more other services and/or service platforms 212, each of which is a customer of a notification service 258. Note that in other embodiments, more, fewer, or different services provided to customer organizations and their end users (which may sometimes be referred to herein as "backend services" of the service provider or service provider network) may be customers of a notification system such as those described herein.

As described in more detail herein, each of service customer end users 275 may receive one or more services from service provider network 205 on whose behalf actionable notification messages are managed by notification service 258. In the example illustrated in FIG. 2, an end user 275 may consumer or otherwise interact with at least some of those services through a dedicated client-side interface mechanism. For example, an end user 275 may interact with desktop application fulfilment platform 208 through desktop application management module 266 in order to receive on-demand access to virtualized desktop application packages. In another example, an end user 275 may interact with resources stack management service 210 through resource stack management service console 268 to receive access to various server products that run as services on service provider resources. In some embodiments, enterprise catalog service platform 206 may provide access to (and/or licenses for) various server products and/or virtualized desktop application that it manages on behalf of the customer organization to end users 275 through desktop application fulfillment platform 208 (and/or desktop application management module 266), resource stack management service 210 (and/or resource stack management service console 268) and/or other service(s) and/or service platforms 212, but may not be directly accessible to end users 275. Note, however, that in other embodiments, more, fewer, or different mechanisms may be provided to service customer IT administrators and/or end users for consuming or otherwise interacting with the services provided by service provider network 205 (and the underlying resources and platforms thereof). For example, in some embodiments, two or more services provided by service provider network 205 may be accessed by a service customer end user 275 though a single end user module or console that is implemented on the end user's computing resource instance 270. Note also that, in some embodiments, end users 275 may not have access to notification service 258 directly (e.g., through a dedicated client-side console such as notification service console 264 illustrated in FIG. 2), but may access various inboxes that they are authorized to access through a user interface of a module or console for one of the backend services from which they receive services.

In this example, IT administrators 202 (and, in some cases, other privileged users) within the customer organization may access the notification service 258 through a service provider management console 204. As illustrated by the dashed lines between elements 204, 206, 208, 210, and 212 in FIG. 2, IT administrators 202 may also access one or more of the other services provided by service provider network 205 through service provider management console 204. In other embodiments, one or more of these other services may be accessed through a different interface mechanism than the one through which IT administrators 202 interact with notification service 258, such as through a dedicated interface module or browser application (e.g., a web page). Note that in some embodiments, a graphical user interface of the service provider management console 204 may present different information and different views at different times in order for the IT administrator to manage desktop applications, server products, or product subscriptions (which may include product licenses); to generate and/or view reports (e.g., desktop application usage and/or server product deployment reports); to create and configure portfolios, or to add products, constraints, and users to portfolios; to search for products; and to view (and, in some cases, take action in response to) various notifications (e.g., from the backend services on whose behalf notification service 258 stores, dispatches, updates, and/or otherwise manages those notifications).

As described in more detail herein, notification service 258 may be configured to manage actionable notification messages that are created by various backend services and that are directed to IT administrators 202 (and/or other privileged user) and end users 275 who consumer those backend services. For example, an IT administrator 202 (e.g., through service provider management console 204) or a backend service (e.g., through one of APIs 214) request the creation of an inbox in which to post various actionable notification messages, after which a backend service may (through one of APIs 214) submit an actionable notification message for posting to the inbox, request a change of state for the actionable notification message, or request information describing various inboxes and/or actionable notification messages that have been posted therein. In the example illustrated in FIG. 2, four such inboxes have been created for management by notification service 258. These include inbox 220 (which currently stores actionable notification messages 222-226), inbox 230 (which currently stores actionable notification messages 232-236), inbox 240 (which currently stores actionable notification messages 242-246), and inbox 250 (which currently stores actionable notification messages 252-256). Each of the inboxes may be configured to store actionable notification messages that were submitted by a particular backend service, that are of a particular message type, or that are directed to particular users (to users having particular roles), in different embodiments.

In this example, an end user 275 may receive (e.g., through notification service console 264 or through a user interface of a module or console for one of the backend services from which they receive services, such as the backend service that initiated the actionable notification message) an alert or other indication when an actionable notification message is posted to an inbox that the end user is authorized to access, after which the end user 275 may retrieve (and, in some cases, take action on) the actionable notification message (e.g., through notification service console 264 or through a user interface of a module or console for one of the backend services from which they receive services, such as the backend service that initiated the actionable notification message). In some embodiments, notification service 258 may employ an external messaging service (a client-side component of which is shown in FIG. 2 as external messaging service 262) in order to alert an end user when an actionable notification message is posted to an inbox that the end user is authorized to access (e.g., through email or a text message). In response to receiving the alert, the end user may retrieve (and, in some cases, take action on) the actionable notification message (e.g., through notification service console 264 or through a user interface of a module or console for one of the backend services from which they receive services, such as the backend service that initiated the actionable notification message).

Note that FIG. 2 illustrates a system 200 that is configured to provide services to members of a single customer organization. However, in other embodiments, the notification system may be configured to manage actionable notification messages on behalf of multiple customers or customer organizations, each of which may create and configure their own inboxes for the actionable notification messages received on their behalf from the backend services they consume.

As noted above, when a backend service creates an actionable notification messages, it may specify a specific inbox in which to store the message. The inbox itself may be controlled in one of several ways, in different embodiments. For example, in some embodiments, an IT administrator may determine which inboxes are valid for their customer organization. For example, within a customer's service provider account, the IT administrator may define one inbox for the use of all of the IT administrators in the organization, another one for a particular project development team, etc. In such embodiments, when a backend service provides actionable notification messages, it can designate the inbox (or inboxes) that need to be notified, depending on the situation. For example, in an emergency, the backend service may direct an actionable notification message to the inbox for all of the IT administrators. In general, the IT administrator may define the rules governing the partitioning of messages received from one or more backend services into multiple inboxes that were created on behalf of the customer organization. Using this approach, the inboxes and rules may have to be set up before a backend service can send an actionable notification message. Therefore, it may be possible that a critical message from a backend service may not be handled correctly prior to the creation and configuration of the inboxes.

In other embodiments, the notification service itself may be configured to automatically one or more inboxes for a customer's service provider account directly. For example, the notification service may create a default inbox and/or an "emergency contact" inbox for the customer organization whether or not an IT administrator also creates inboxes for the customer organization. Using this approach, a backend service may have a place for any actionable notification messages it creates to be stored by the notification service (and subsequently retrieved from) regardless of when (or whether) more specific inboxes are created on the customer organization's behalf.

Note that, in some embodiments, a backend service that submits an actionable notification message to an inbox to be managed by the notification service may not know (or have any need to know) which of multiple authorized recipients actually retrieved the actionable notification message or when. However, after an authorized recipient selects an action included in the actionable notification message, the backend service may be able to determine that the action was performed, and may update the state of the actionable notification message accordingly.

In some embodiments, an IT administrator in a service provider customer organization may define inboxes for the customer organization and may also set up (for each backend service from which actionable notification messages will be submitted to the notification service) rules about which actionable notification messages should be stored in which of the customer organization's inboxes. In some embodiments, the IT administrator may associate a message topic with an inbox. In such embodiments, if a customer or member of the customer organization is a subscriber to that message topic, they may receive an alert when an actionable notification message associated with that message topic is stored by the notification service and/or when any actionable notification message is stored in the inbox associated with that message topic.

Note that the notification service and/or the backend services that are clients/customers of the notification service may make a distinction between the users who have permissions to access an inbox (e.g., to view the messages in an inbox) and the users who have permissions to initiate the performance of one of the actions included in a particular actionable notification message that is stored in an inbox that they are authorized to view. Note also that, in some embodiments, an IT administrator may be able to grant permissions to one or more other members of the customer organization (e.g., another IT administrator or an end user) to perform actions that might otherwise be limited to the IT administrator (e.g., modifying or deleting an inbox, or taking an action on an actionable notification message that is directed to multiple IT administrator or other privileged users).

In various embodiments, the notification services (or inbox services) described herein may, among other things, have the ability to create messages (e.g., actionable notification messages), assign them to an inbox, and, if a message topic is specified during creation of the messages, push the messages to the message topic; delete messages; access the list of all non-deleted messages for a specified inbox; and/or create, read, update, and delete an inbox, and/or associate it with a message topic. In some embodiments, each of the actionable notification messages that are handled by the notification services described herein may include any or all of the following message elements:

- a creation date
- a unique resource identifier for the recipient inbox
- the subject of the message (e.g., a string)
- the content of the message (e.g., a string)
- a message type (e.g., a field that describes one of a pre-determined list of message templates that will be used for rendering the message in various user interfaces, e.g. "PlaintextMessage" or "LinkToConsole")
- a unique message identifier
- a source ID (e.g., an identifier of the backend service that created the message, e.g., "desktop application fulfillment platform", "resource stack management service", "approval service", etc.)
- an indication of the message state (e.g., a string having one of multiple pre-determined values, including "active" and "inactive", among others). Note that upon creation, the state of a message is "active".
- a client token (e.g., an idempotency token)
- an externally unique identifier. Note that the combination of client token plus external ID may allow a caller to know if their call completed successfully or not.

In various embodiments, each inbox may include (or be associated with, through its definition) any or all of the following:

- an inbox name (e.g., a string that is unique for a given service provider customer or end user in a given region)
- a unique resource identifier for the inbox
- a namespace (e.g., a identifier of the service provider customer account that owns and can view the inbox)
- an access policy (e.g., an IAM policy that determines who can view the inbox). Note that, in some embodiments, if no policy is specified, the inbox and all messages sent to it may be viewable for all users (IAM and root users) in the namespace of the inbox.
- a message topic (if the customer elects to employ this optional feature). Note that if the customer opts-in (and creates the message topic) they may also need to create a role and give the notification service access to that message topic via that role.

In some embodiments, the notification service may have the ability to track which messages have been read by the recipient. The notification service may also have the ability to create inboxes that are shared between more than one service provider account (e.g., between multiple service provider accounts for a large customer organization or between service provider accounts of organizations that have partnership or contractual relationships).

In various embodiments, the actionable notification messages created by a backend service and maintained in various inboxes by the notification service may include messages of any or all of the following types: a request for approval to take an action, a request to access a resource, a request to access a service, an indication of the availability of a new resource or resource version, a response to a request submitted on behalf of the customer, a push notification for a resource or service, or a sunset notification for a resource or service. In some embodiments, the actionable notification messages may include an expiration date and (if an expiration date is specified) an expiration action. In such embodiments, if an actionable notification message reaches its expiration date, the notification service may be configured to delete the actionable notification message and/or to take another specified action. Note that end users may not be able to view deleted actionable notification messages. However, in some embodiments, IT administrators (e.g., an IT administrator that has set the state of an actionable notification message to "deleted") may still be able to view such "deleted" messages.

As previously noted, the notification services described herein may support the use of various application programming interfaces by IT administrators. For example, a notification service may support any or all of the following APIs for the use of IT administrators:

CreateInbox—This API may take as inputs an inbox name, and a unique resource identifier for message topic to be associated with the inbox (if any), and may generate a unique resource identifier for the inbox and create an inbox using the specified inputs. In some embodiments, the inbox name must be unique for the customer account in the region.

UpdateInbox—This API may take as input an inbox name, and may replaces the specified (previously-created) inbox with a new one, as specified by the input.

DeleteInbox—This API may take as an input an inbox name, and may delete the specified inbox for the calling user.

ListInboxes—This API may (implicitly) take the identifier of the calling user as an input, and may return, for all inboxes created by that user, the name, the unique resource identifier for the inbox, and a unique resource identifier for the message topic(s) associated with the inbox (if any).

DescribeInbox—This API may take as inputs the unique resource identifier of an inbox and a description of the inbox (e.g., a string) and may apply (or associate) the description to/with the inbox.

In various embodiments, the notification services described herein may support any or all of the following APIs related to actionable notification messages:

CreateMessage—This non-public API may be used by a backend service to create an actionable notification message. It may take as inputs a customer inbox name, a customer namespace, a subject, content (which may include one or more actionable elements), and/or other optional elements. In some embodiments, if the specified inbox does not exist for the customer, it may be created by the notification service.

DeleteMessage—This non-public API may be used by a backend service to delete a specified message. It may take as inputs an identifier of the message (e.g., a unique resource identifier for the message) and a customer namespace, and may delete the specified message from the inbox.

ListMessages—This API may take as input an identifier of an inbox (e.g., a unique resource identifier for the inbox), and may return, for each message in the inbox, its subject, a unique resource identifier for the message, its creation date, an identifier of its source, and its state. Note that this API may validate that the caller is allowed to access the specified inbox before returning the requested information.

DescribeMessage—This API may take as input a unique resource identifier of a message and may return the specified message. Note that this API may validate that the caller is allowed to access the specified message before returning the requested information.

SetMessageActiveStatus—This non-public API may be used by a backend service. It may take as inputs an identifier of the message (e.g., a unique resource identifier for the message), a state, and a customer namespace, and may set the state of the message to the specified state.

In various embodiments, the inboxes and actionable notification messages described herein may be stored by the notification service on service provider storage resources (e.g., in database tables or in one or more object-based or file-based storage systems, some of which may be key-value storage systems). In one example, for each inbox, the primary key may include a namespace (or a hash of the namespace) and an inbox name within that namespace. Other attributes of each inbox that may be stored in association with the inbox may include an identifier of the inbox (e.g., a unique resource identifier), an identifier of a message topic that is associated with the inbox, and an IAM policy. In one example, for each message in each of the inboxes, the primary key may include an identifier of the message (e.g., a unique resource identifier for the message, or a hash of at least a portion of the unique resource identifier for the message). Other attributes of each message that may be stored in association with the message may include the subject, a unique resource identifier for the inbox in which it is stored, its creation date, its content, its state, a message identifier, a source identifier and/or other optional message elements.

Note that, in various embodiments, an IT administrator may create multiple inboxes for a customer organization (for any reason), and may authorize different members of the customer organization to retrieve actionable notification messages from them. For example, the IT administrator may create more than one inbox into which different actionable notification messages received from a single backend service may be stored, or may create a single inbox into which actionable notification messages received from multiple backend services may be aggregated. In various embodiments, the actionable notification message may be partitioned into different inboxes by source, message type, targeted (authorized) recipients, user roles/permissions or an associated message topic.

Figure 3:
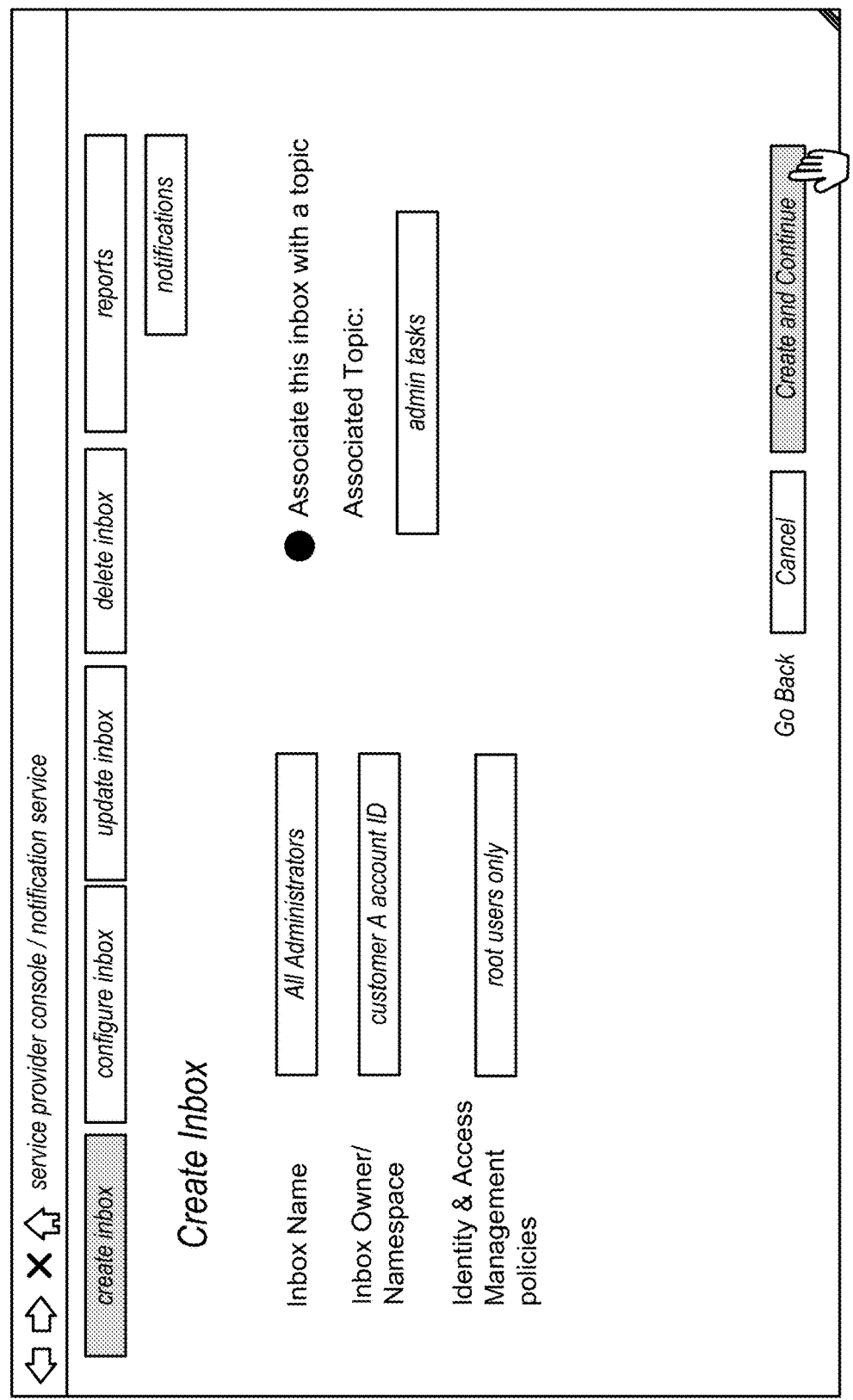
FIG. 3 illustrates an example of the information presented to an IT administrator through a graphical user interface of a service provider management console when creating an inbox to be managed by a notification service, according to at least some embodiments.

FIG. 3 illustrates an example of the information presented to an IT administrator through a graphical user interface of a service provider management console when creating an inbox to be managed by a notification service, according to at least some embodiments. As illustrated in this example, when creating the inbox, the IT administrator may provide input specifying one or more of: an inbox name (in this case, "All Administrators"), an indication the inbox owner or namespace (in this case, the account identifier for customer A), and an identity and access management policy (in this case, specifying that only users with root permissions can access this inbox). In some embodiments, the IT administrator may also (optionally) elect to associate a message topic with this inbox. In such embodiments, another service or utility may be configured to "listen" to the actionable notification messages that are exchanged between the notification service and one or more backend services and to direct messages having this topic to the newly created inbox. In this example, the IT administrator has elected to associate the topic "admin tasks" with this inbox. Once the selections illustrated in FIG. 3 have been made, the IT administrator may select an option to "Create and Continue", after which the IT administrator may be presented with an information for configuring the newly created inbox. note that when the inbox is created, the notification service may generate a unique resource for the inbox, which may subsequently be included in actionable notification messages directed to the inbox and/or in various APIs that perform actions on (or related to) the inbox.

Figure 4:
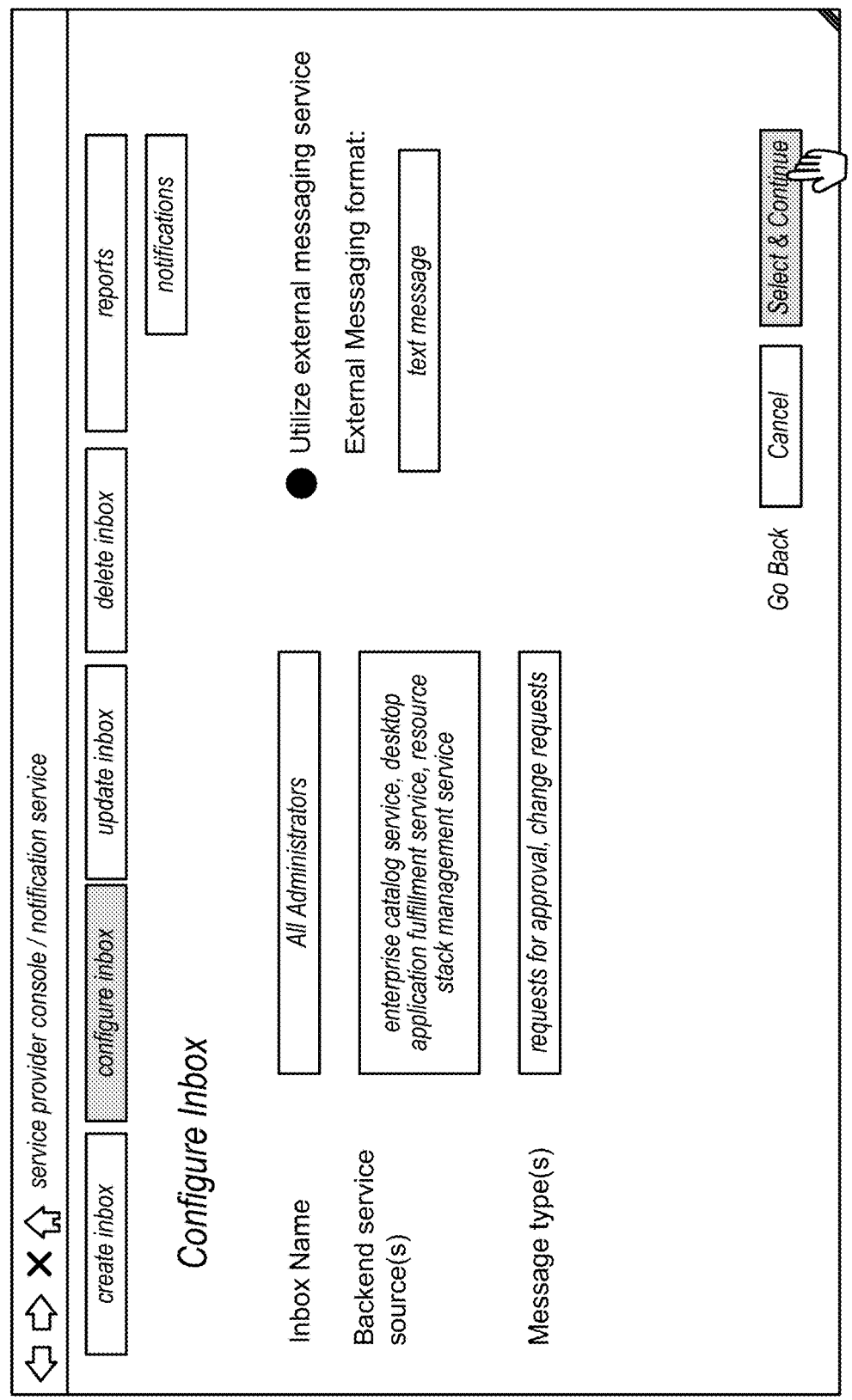
FIG. 4 illustrates an example of the information presented to an IT administrator through a graphical user interface of a service provider management console when configuring an inbox that is to be managed by a notification service, according to at least some embodiments.

FIG. 4 illustrates an example of the information presented to an IT administrator through a graphical user interface of a service provider management console when configuring an inbox that is to be managed by a notification service, according to at least some embodiments. In this example the IT administrator has elected to configure the newly created inbox "All Administrators". To configure this inbox, the IT administrator has provided input indicating that actionable notification messages that are created and submitted to the notification service by an enterprise catalog service, desktop application fulfillment service, and resource stack management service (such as those illustrated in FIG. 2 and described herein) may be posted to this inbox, and that the types of messages to be posted to this inbox include requests for approval and/or change requests. The IT administrator has also provided input indicating that an external messaging service will be employed (when appropriate) to alert users who are authorized to access this inbox (e.g., only IT administrators and other privileged users with root permissions, in this case) when an actionable notification message is posted to the inbox. The IT administrator has indicated that the format for these alerts will be text messages.

Note that in some embodiments, the information provided by the IT administrator indicating the backend services sources and/or message types associated with this inbox may be for information purposed only, and may not have any functional effect on the operation of the inbox or the partitioning of actionable notification messages between the inboxes of a customer organization. Instead, the backend services themselves may be responsible for directing actionable notification messages to particular ones of the inboxes that were created on behalf of a customer organization, according to configuration information provided by the IT administrator when contracting for those services. In other embodiments, the information provided by the IT administrator indicating the backend services sources and/or message types associated with this inbox may be used to configure the backend services so that they direct actionable notification messages to particular inboxes in accordance with this information.

Figure 5:
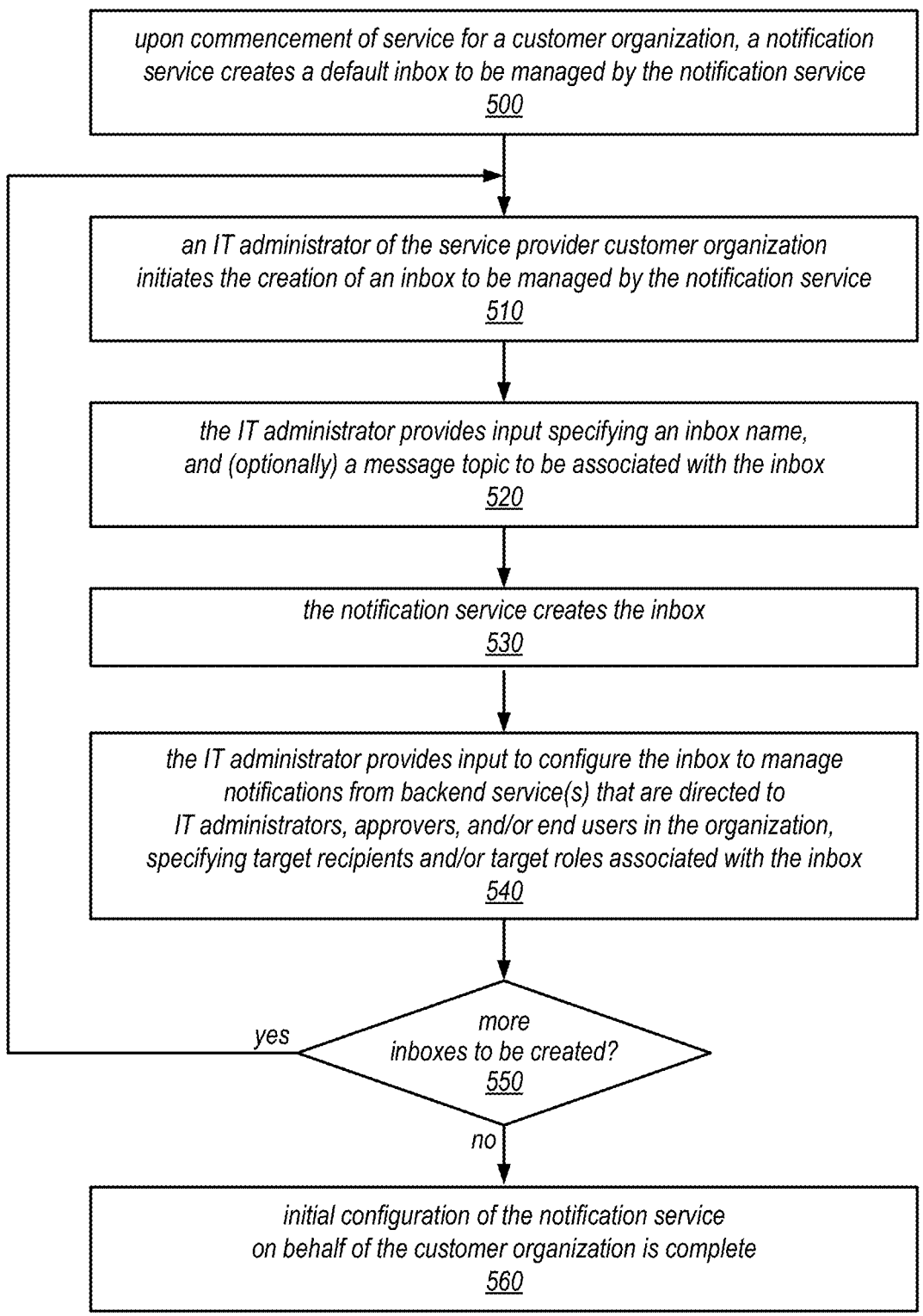
FIG. 5 is a flow diagram illustrating one embodiment of a method for creating and configuring inboxes in a notification service.

One embodiment of a method for creating and configuring inboxes in a notification service is illustrated by the flow diagram in FIG. 5. As illustrated at 500, in this example, the method may include, upon the commencement of service for a customer organization, a notification service creating a default inbox to be managed by the notification service. The method may also include an IT administrator of the service provider customer organization initiating (e.g., through an interface of a service provider management console) the creation of an inbox (e.g., a customer-defined inbox) to be managed by the notification service. The method may include, as part of creating the inbox, the IT administrator providing input specifying an inbox name, and (optionally) a message topic to be associated with the inbox (as in 520), after which the notification service may create the inbox (as in 530).

As illustrated in this example, the method may include (as part of the creation process), the IT administrator providing input to configure the inbox to manage notifications from backend service(s) that are directed to IT administrators, approvers, and/or end users in the customer organization, specifying target recipients and/or target roles associated with the inbox, as in 540. Note that in some embodiments, the IT administrator may also provide input specifying message sources and/or message types, as described above. Note also that in other embodiments, the IT administrator may configure (or reconfigure) the inbox at another time, rather than as part of an interaction to create the inbox. As illustrated in FIG. 5, if there are more inboxes to be created (shown as the positive exit from 550), the method may include repeating the operations illustrated in 510-540 for each additional inbox. If, or once, no additional inboxes are to be created during this creation and configuration exercise (shown as the negative exit from 550), the initial configuration of the notification service on behalf of the customer organization may be complete, as in 560. Note that the number and//or configuration of inboxes to be used in managing notifications for the customer organization may be modified subsequent to a creation and configuration exercise, such as that illustrated in FIG. 5. However, in some embodiments, such modifications may only be made by the IT administrator that performed the initial creation and configuration exercise, or by another privileged user in the customer organization who has been authorized to make those modifications.

Figure 6:
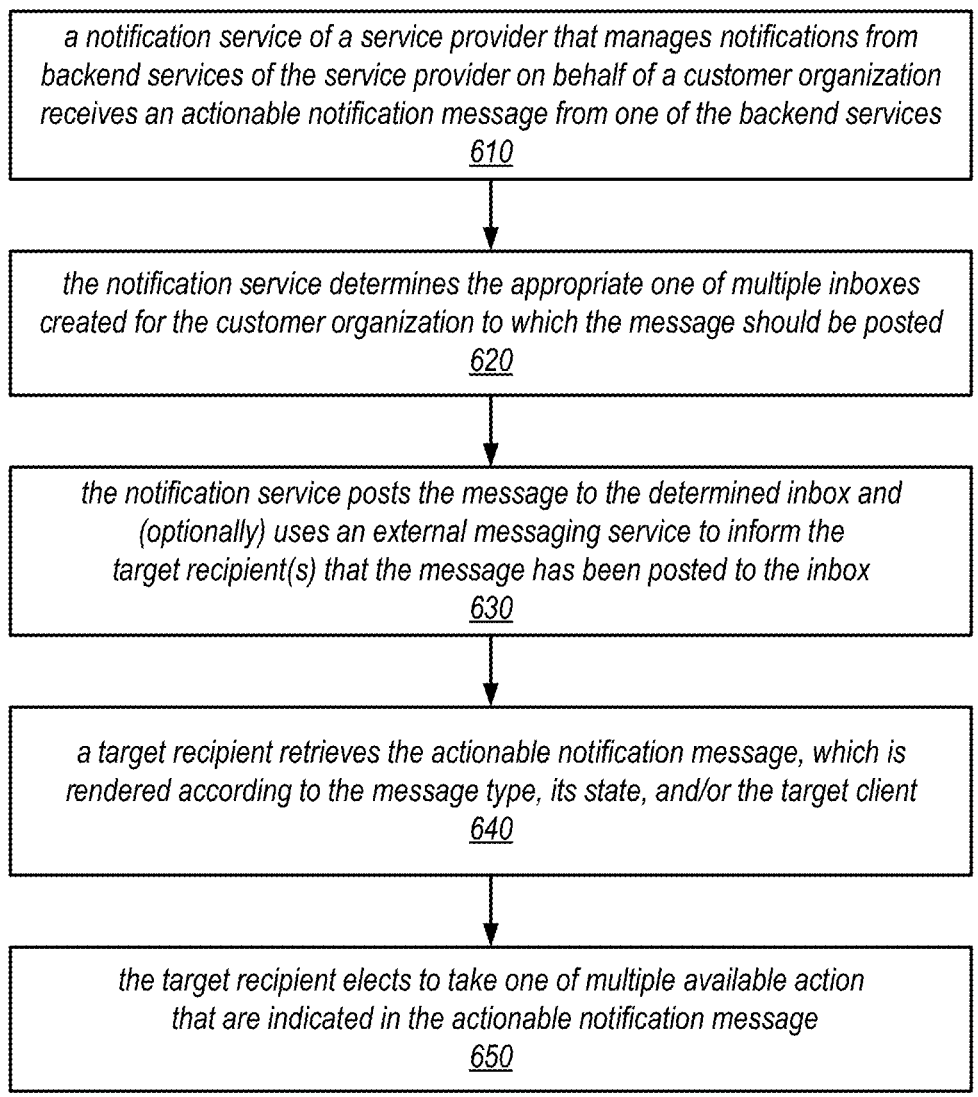
FIG. 6 is a flow diagram illustrating one embodiment of a method for handling actionable notification messages from backend services of a service provider.

One embodiment of a method for handling actionable notification messages from backend services of a service provider is illustrated by the flow diagram in FIG. 6. As illustrated at 610, in this example, the method may include a notification service of a service provider that manages notifications from backend services of the service provider on behalf of a customer organization receiving an actionable notification message from one of the backend services. The method may include the notification service determining the appropriate one of multiple inboxes that were created for the customer organization to which the message should be posted (e.g., based on an identifier of the inbox that is included in the message and/or on a message topic that was associated with an inbox during the configuration of the customer organization's inboxes), as in 620.

As illustrated in this example, the method may include the notification service posting the message to the determined inbox and (optionally) using an external messaging service (e.g., an email or text messaging service) to inform the target recipient (or multiple potential recipients) that the message has been posted to that inbox, as in 630. The method may include the target recipient (or one of multiple potential recipients) retrieving the actionable notification message, which may be rendered for them by the notification service, where the rendering may be dependent on the message type and/or its state, as in 640. Note that, in some embodiments, the rendering may also be dependent on the client for which the actionable notification message is rendered. For example, in some embodiments, the format of the message may be dependent on the end user console or administrator console for which it is rendered and/or the type of device for which it is rendered. In some embodiments, the content (including the available actions) that is included in the rendered message may be dependent on the console for which it is rendered and/or the type of device for which it is rendered (e.g., in embodiments in which certain actions can only be taken in a particular region or cannot be taken on mobile devices). For example, some types of approvals (e.g., an approval to share or modify a portfolio) may only be made by IT administrators who are in their offices (e.g., working on their desktop computers or working within the walls of customer organization facilities) and/or are working in the U.S. In this example, actions that cannot be taken by customer organization members in other circumstances may not be presented to them in the actionable notification messages that are rendered on their behalf. Restrictions on end user actions may be similarly enforced through the rendering of actionable notification messages that include only the actions available to them on the clients through which they access them. The method may also include the target recipient who retrieved the message electing to take one of multiple available actions that are indicated in the actionable notification message, as in 650.

As previously noted, in some embodiments, a backend service that creates an actionable notification message may be responsible for managing the lifecycle of the message. For example, the notification service itself may not have any knowledge of the semantics of the operations of the backend services or of the actions that may be included in the actionable notifications messages they create. Therefore, it may be up to the backend services themselves to determine when, and if, the actions included in those messages have been taken and to respond accordingly (which may include updating the state of the messages). In one example, an enterprise catalog service may create an actionable notification message related to the sharing of a portfolio of software products that includes an action "share portfolio." The notification service may not know (or have any need to know) anything about this action (e.g., what it does, how it is performed, or why it would or would not be selected by a message recipient). However, if this action is selected by a message recipient, the enterprise catalog service may be able to determine that this action has been performed and may respond to this determination in a manner that is in keeping with the operations of the enterprise catalog service in the context created by its performance.

Note that, in some embodiments, a backend service that determines, for an actionable notification message that it created, that one of the available actions included in the message was selected and performed may change the state of the actionable notification message to "inactive" or "delete", after which it may be ignored by other authorized message recipients and/or deleted from the inbox in which it was stored. In other words, once a message recipient has responded to the actionable notification message by taking action, the message itself may not have any additional purpose. However, it may be up to the backend service to decide how to respond in this situation. For example, in some embodiments, the backend service may be configured to respond to this situation in a manner that results in all of the actionable notification messages it has created, regardless of their states, being maintained indefinitely by the notification service as a record of the interactions between the backend service and the consumers of the backend service, or for another purpose. In another example, a customer organization may prefer that all of the actionable notification messages that were created, on behalf of the customer organization, regardless of their states, be maintained by the notification service indefinitely or for a predetermined length of time. In this example, the customer organization may be willing to pay a premium to be able to maintain the actionable notification messages in the notification service and/or to archive actionable notification messages once they become inactive or irrelevant. In some embodiments, a backend service may determine that, based on a change in conditions since a particular actionable notification service was created, that the actionable notification service is no longer relevant (e.g., that there is no need for any message recipient to view the message or take any of the actions presented therein and/or that doing so would be inconsistent with the current conditions). In some such embodiments, the backend service may be configured to change the state of the actionable notification message to "inactive" or "delete", after which it may be ignored by other authorized message recipients and/or deleted from the inbox in which it was stored.

Figure 7:
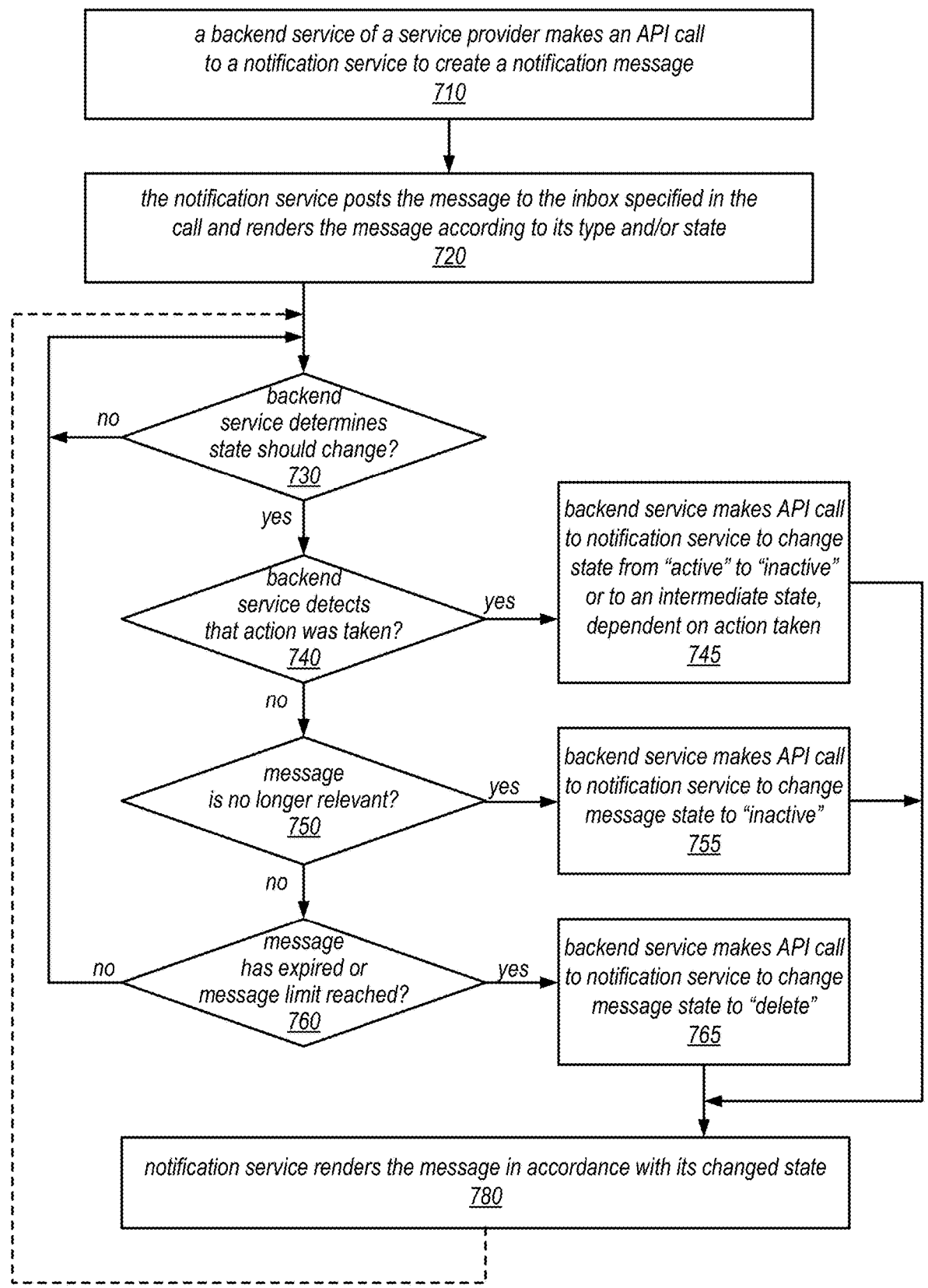
FIG. 7 is a flow diagram illustrating one embodiment of a method for managing the lifecycle of an actionable notification message.

One embodiment of a method for managing the lifecycle of an actionable notification message is illustrated by the flow diagram in FIG. 7. As illustrated at 710, in this example, the method may include a backend service of a service provider making an API call to a notification service to create a notification message (e.g., an actionable notification message). The method may include the notification service posting the message to the inbox specified in the call and rendering the message according to its type and/or state, as in 720. As described herein, after creating an actionable notification message, the backend service that created the actionable notification message may be responsible for managing the lifecycle of the actionable notification message, such as determining when and if the state of the actionable notification message should change (as in 730).

As illustrated in FIG. 7, if and when the backend service determines that the state of the actionable notification message should change, shown as the positive exit from 730, the backend service may respond to this determination by changing the state of the notification. For example, if the backend service detects that an action was taken for the notification (e.g., one of multiple available actions included in the actionable notification message), shown as the positive exit from 740, the method may include the backend service making an API call to the notification service to change the state of the notification from "active" to "inactive" or from "active" to an intermediate state (assuming that this is the first state change for the actionable notification message since it was created), dependent on which of the available actions was taken, as in 745.

As illustrated in this example, if no action has been taken on the notification message (shown as the negative exit from 740), but the backend service determines that the notification message is no longer relevant, shown as the positive exit from 750, the method may include the backend service making an API call to the notification service to change the state of the actionable notification message to "inactive", as in 755. For example, the state of the actionable notification message may be changed from its current state (which may be "active" or some intermediate state) to "inactive". Alternatively, if the actionable notification message has expired or if a limit on the maximum number of actionable notification messages that can be held by the notification service (or in a particular inbox) on behalf of the customer organization, shown as the positive exit from 760, the method may include the backend service making an API call to the notification service to change the state of the actionable notification message to "delete", as in 765.

As illustrated in this example, subsequent to changing the state of the actionable notification message (for any of the reasons described above or other reasons), the method may include the notification service rendering the actionable notification message in accordance with its changed state, as in 780. Note that, in this example, unless the actionable notification message has been deleted, the backend service may continue to be responsible for the lifecycle of the actionable notification message and may make additional changes to its state, as appropriate. This is illustrated in FIG. 7 by the feedback from 780 to 730. Note also that, in other embodiments, an actionable notification message that has been deleted (or marked for deletion by changing its state to "delete") may be subsequent reactivated by the backend service that is responsible for its lifecycle. In such embodiments, the backend service may make an API call to the notification service to change the state of the actionable notification message to "active" or to a separate "reactivated" state.

As described herein, by offering a notification service such as those described herein, a service provider may allow customers of one of more their backend services to define actionable notification messages for the backend services they receive, and to set up any number of inboxes into which the actionable notification messages can be stored and from which they can be retrieved by authorized recipients. For example, if a service provider customer (or customer organization) is a customer of an enterprise service catalog, the customer (or an IT administrator of the customer organization) could set up notifications for that service. Similarly, if the service provider customer (or customer organization) is a customer of a desktop application fulfillment platform and/or a resource stack management service, the customer (or an IT administrator of the customer organization) could set up notifications for those services.

Note that while several examples included herein describe these types of services, in other embodiments, any backend services that are configured to take advantage of the notification services described herein may (e.g., though the use of various APIs) interoperate with such a notification service on behalf of their customers. For example, a data storage service, a database service, or a service that provides access to virtualized computing resources may be configured to interoperate with the notification services described herein (e.g., using the APIs defined by the notification service for the backend service and/or for any client-side end user portion of the backend service (if one exists). Note also that, in some embodiments a service that is provided by an entity other than the service provider that provides the notification service (e.g., a service provided to a customer organization through a partnership or contractual relationship with the customer organization) may create and submit actionable notification messages to the notification service and/or retrieve actionable notification messages from inboxes maintained by the notification service.

In some embodiments, the systems and methods described herein may be used to handle "soft failures" that are encountered by service customers. For example, in a system that employs the actionable notification messages described herein, if an end user attempts to perform on operation that the end user does not have permission to perform (e.g., to access a service or other resource that the end user is not authorized to access), rather than just returning a denial of the request, an actionable notification message may be returned to the end user that presents multiple available actions the end user can take. In this example, those actions may include requesting permission to perform the operation, retrying the operation, or cancelling the request. If the end user elects to request permission to perform the action, this may trigger the initiation of an approval workflow. Subsequently, an approver (e.g., an IT administrator or manager) may create another actionable notification message indicating to the end user whether the request was approved and offering one or more actions to take next. Note that in some embodiments, an IT administrator or end user may periodically poll an inbox that they have permission to view to see whether any actionable notification messages have been posted and, if so, to retrieve them and (potentially) to select an action included in the messages. In other embodiments, an IT administrator or end user may receive alerts when an actionable notification message is placed in an inbox that they are authorized to access (e.g., through an end user console of a backend service that they consume, such as the backend service that originated the message) or through an external messaging service (e.g., an email or text messaging service).

Figure 8A:
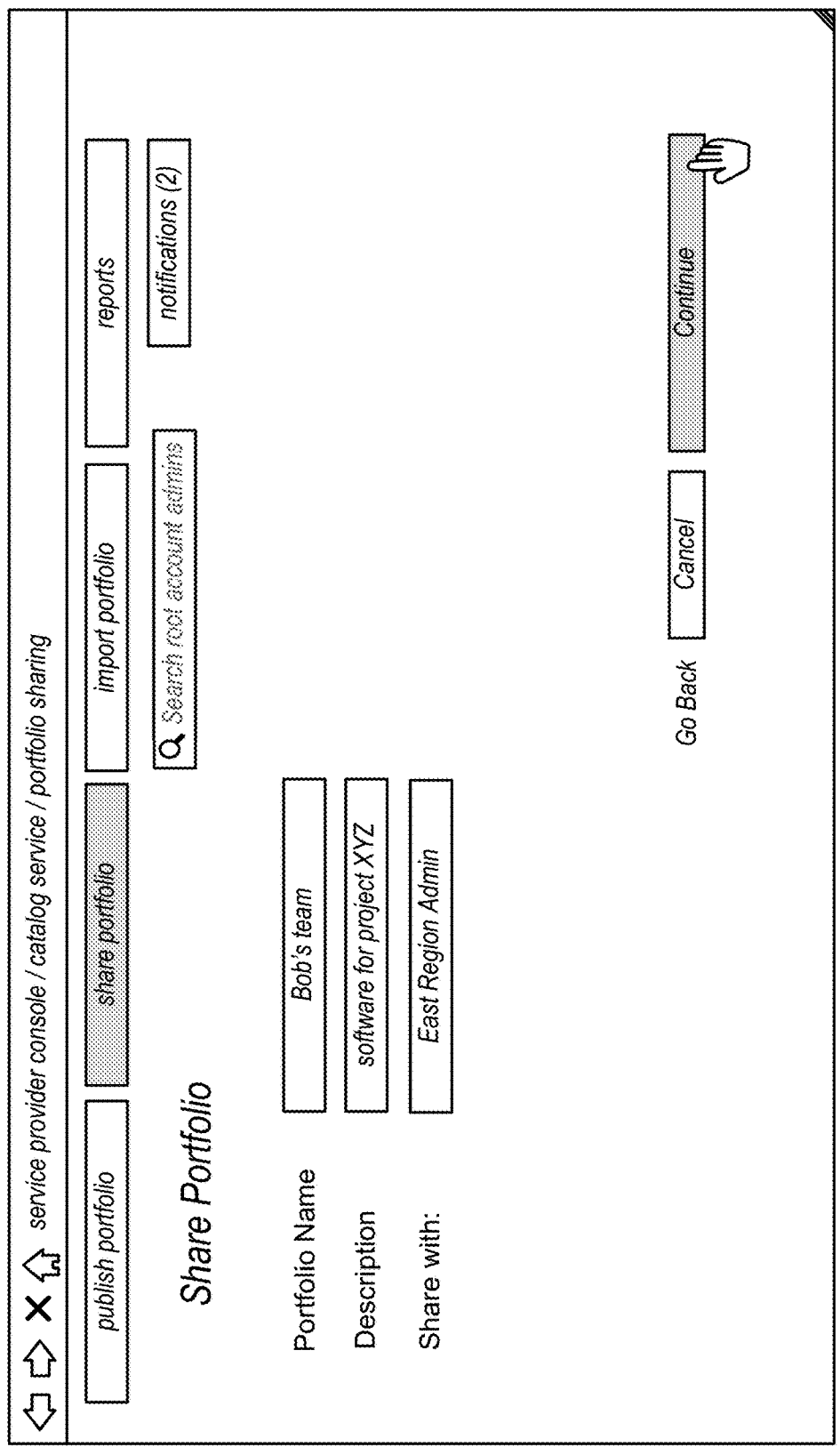
FIG. 8A illustrates an example of the information presented to an IT administrator through a graphical user interface of a service provider management console when initiating a portfolio sharing operation, according to at least some embodiments.

FIG. 8A illustrates an example of the information presented to an IT administrator through a graphical user interface of a service provider management console when initiating a portfolio sharing operation of an enterprise catalog service platform, according to at least some embodiments. In this example, FIG. 8A illustrates information presented by a GUI 800 on behalf of the enterprise catalog service after the IT administrator or buyer identified as "Central IT Admin" (as the owner of the portfolio "Bob's team"), has selected a portfolio sharing operation. More specifically, the IT administrator or buyer has selected an option to share the portfolio identified as "Bob's team" with another IT administrator in the same customer organization. In this example, the IT administrator has chosen the portfolio to be shared ("Bob's team") and the recipient (identified as "East Region Admin") using text box elements or pull-down menu options. In some embodiments, once the IT administrator has entered this information and selecting "Continue" at the bottom of the display, a unique resource identifier (e.g., the "portfolio key") for the selected portfolio may be sent to the name recipient (e.g., a notification to that effect may be sent to the recipient by the enterprise catalog service), or the portfolio may be published to a catalog that is discoverable by the recipient. Other options for portfolio sharing that may be selected from the display shown in FIG. 8A include a general "publish portfolio" option (which may make the name of the portfolio and/or its contents discoverable by entitled users and user groups following its creation or configuration), or an "import portfolio" option, which may be used to import a portfolio whose unique resource identifier (portfolio key) was shared with the IT administrator by another portfolio owner. After making the indicated selections, the IT administrator may select an option to "Continue", which may initiate an approval process for the selected sharing operation.

Figure 8B:
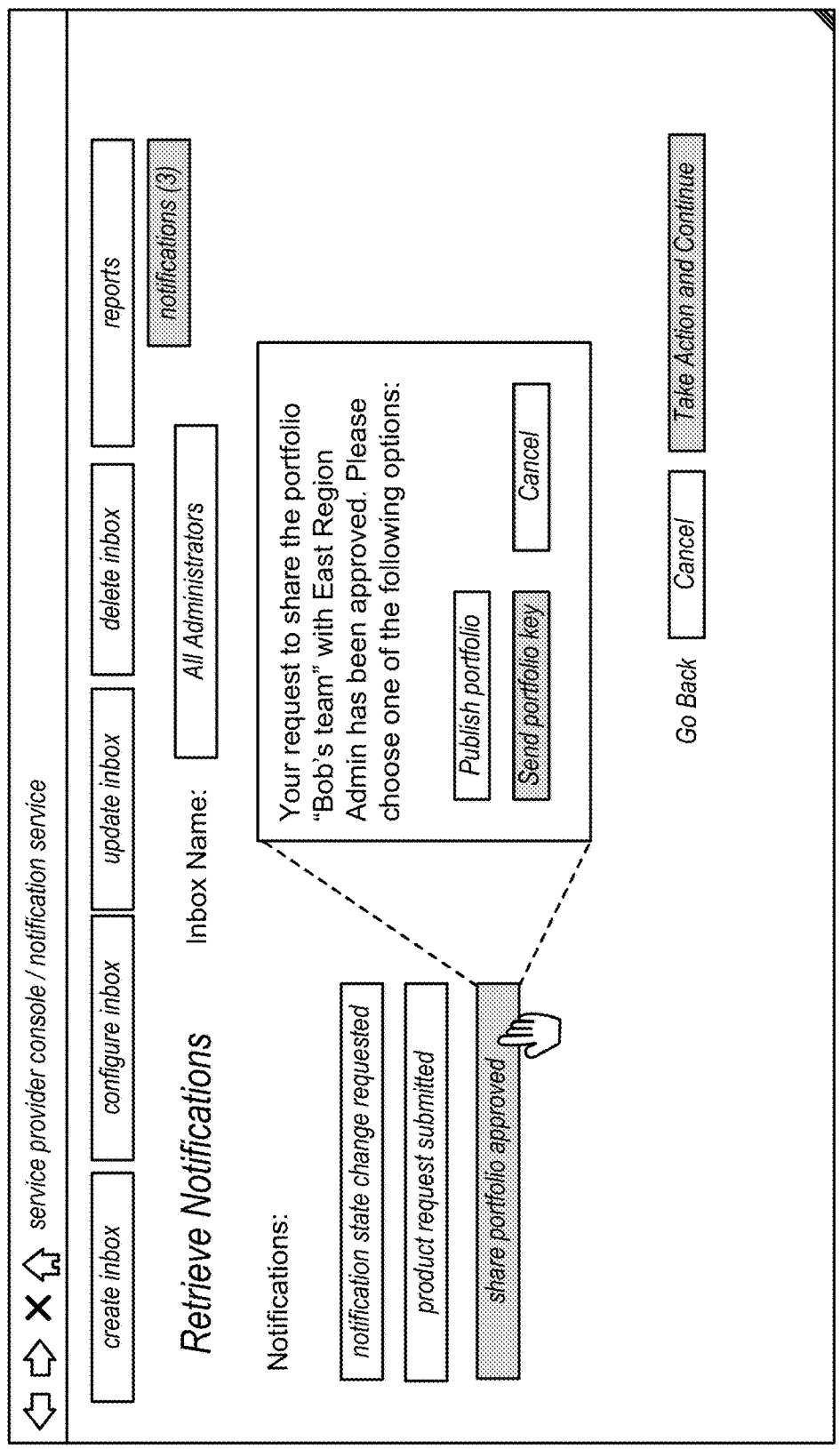
FIG. 8B illustrates an example of the information presented to an IT administrator through a graphical user interface of a service provider management console when viewing actionable notification messages in an inbox to be managed by a notification service, according to at least some embodiments.

FIG. 8B illustrates an example of the information presented to an IT administrator through a graphical user interface 850 of a service provider management console when viewing actionable notification messages in an inbox to be managed by a notification service, according to at least some embodiments. Note that the information presented to an IT administrator in GUI 850 (e.g., when the IT administrator logs into the notification service through a service provider management console such as that illustrated in FIG. 2) may include different information and options than those presented to an end user who accesses the notification service (or various inboxes thereof). As illustrated in this example, in response to the IT administrator selecting the "notifications" tab near the top right corner of the display, a list of three actionable notification messages that have been posted to the inbox "All Administrators" is displayed. The actionable notification messages include a message indicating that a notification state change is requested, a message indicating that a product has been submitted, and a notification that a portfolio sharing operation (e.g., the operation to share the portfolio "Bob's team" with a recipient "East Region Admin" that was initiated by the IT administrator's selections illustrated in FIG. 8A) has been approved.

In response to the IT administrator selecting the third actionable notification message in this list, a pop-up user interface element is presented that includes actionable links for three options for taking action in response to this notification. In this example, selecting the action "Publish portfolio" may initiate a workflow by which the portfolio "Bob's team" (e.g., the name and/or contents of the portfolio) is made discoverable (e.g., able to be found) by the recipient, selecting the action "Send portfolio key" may initiate the sending of the unique resource identifier for the portfolio "Bob's team" to the recipient, and selecting the action "cancel" may initiate a change of the state of this notification to "inactive". In this example, the IT administrator has chosen the option "send portfolio key" and in response to the IT administrator electing to "Take Action and Continue", shown near the bottom right corner of GUI 850, this action may be performed and the state of the corresponding actionable notification may be changes to "inactive".

Figure 9A:
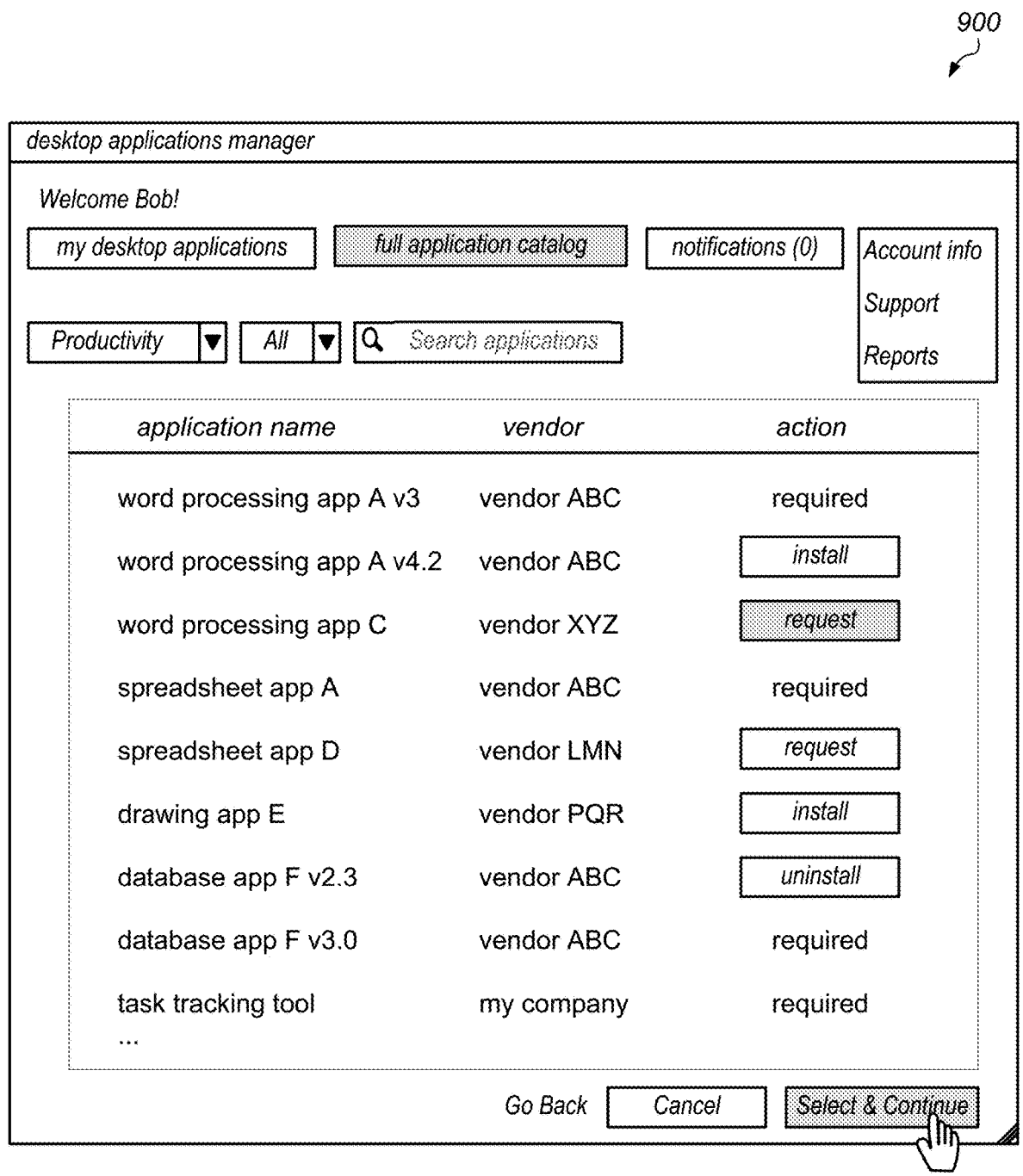
FIGS. 9A and 9B illustrate examples of the information presented to an end user through a graphical user interface of a desktop application management module when the end user elects to request access to a desktop application, according to at least some embodiments.
Figure 9B:
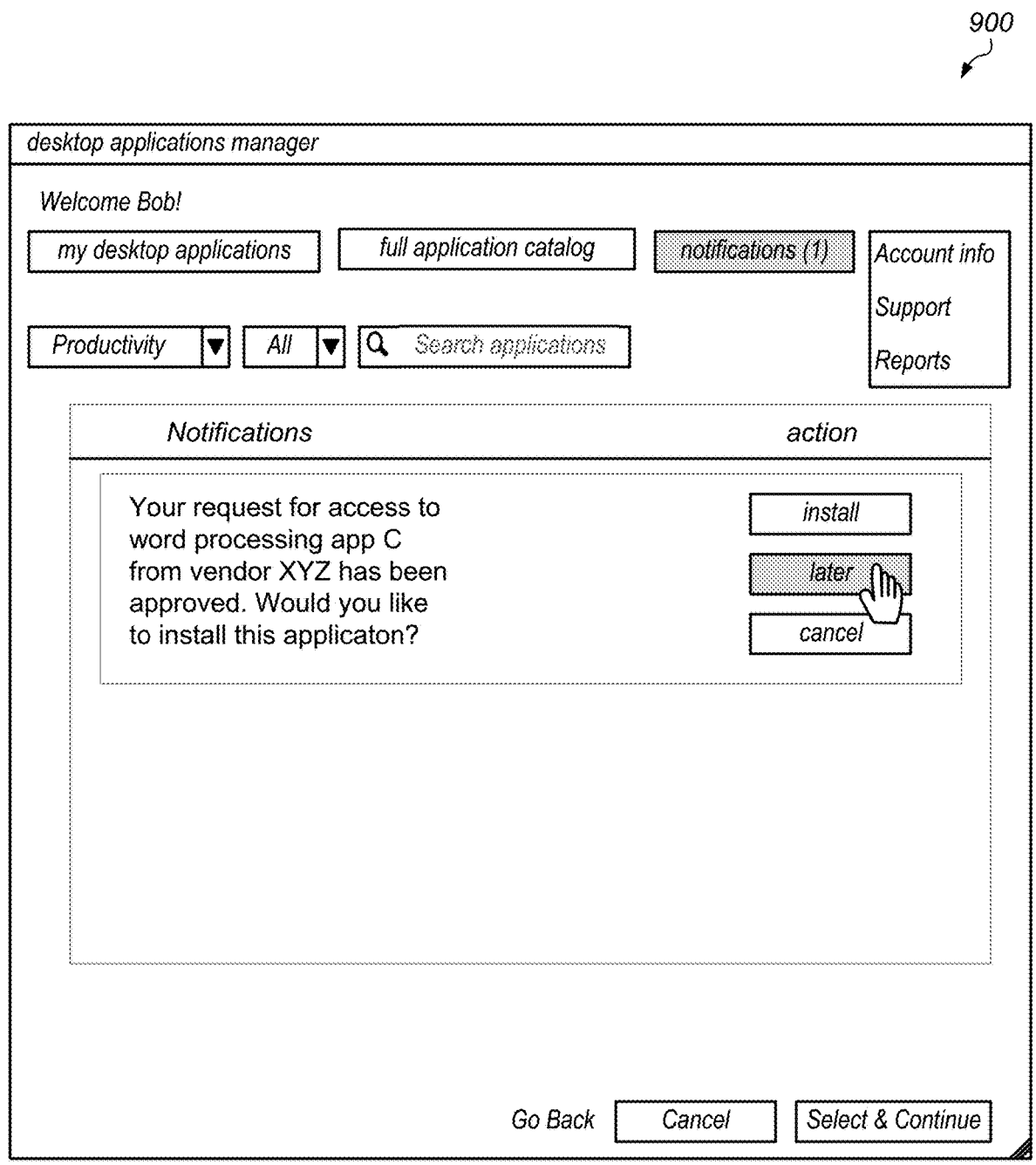

FIGS. 9A and 9B illustrate examples of the information presented to an end user in a customer organization through a graphical user interface of a desktop application management module (such as desktop application management module 266 in FIG. 2) when the end user elects to request access to a desktop application, according to at least some embodiments. More specifically, FIG. 9A is a block diagram illustrating one embodiment of a graphical user interface (GUI) 900 for a desktop application management module that is installed on an end user's computing resource instance, such as desktop application management module 266 illustrated in FIG. 2. Through this interface, an end user may view applications that are assigned to the end user or are part of a private catalog or portfolio of applications made available to the end user and/or one or more other end users (e.g., through an enterprise catalog service platform such as enterprise catalog service platform 206 in FIG. 2) by an IT administrator in the same business, enterprise, or organization ("my desktop applications"). In some embodiments, the list of applications presented by the selection of "my desktop applications" may include the union of the set of applications that have been individually and directly assigned to the end user and any applications included in portfolios with which the end user is associated and for which the end user has been granted access permissions (e.g., a logical private catalog for the end user).

In the example illustrated in FIG. 9A, the end user has chosen to view information about a "full application catalog". This catalog may include customer-specific line-of-business applications (e.g., applications developed or published by the customer organization itself), applications developed and/or published by the service provider, and/or applications developed and/or published by someone other than the end user's company or the service provider. In addition, the full application catalog displayed in FIG. 9A may include customer-specific line-of-business applications, applications developed and/or published by the service provider and/or third party applications that have not been assigned to the end user or that are included in a catalog that is made available to the end user by their IT administrator (including some for which the business, enterprise, or organization does not yet have a subscription or license) instead of, or in addition to, applications that are included in a catalog or portfolio of applications that have been made available to the end user and/or one or more other end users by an IT administrator (whether or not the applications are assigned to the end user). For example, the list of applications presented in graphical user interface 900 illustrated in FIG. 9A includes a word processing application (word processing app C) and a spreadsheet application (spreadsheet app D) that are not currently assigned to the end user or included in the end user's private catalog that is presented in FIG. 9A. In this case, the end user has selected a "request" action in order to request access to (e.g., a subscription to) one of these applications (specifically, word processing app C). If the application has not yet been licensed by the service provider or the end user's company, selecting this action may, if the request is approved, initiate the acquisition and/or licensing of the application by the service provider or the end user's company and the ingestion of the application into the application fulfillment platform. Note that, in some embodiments, an application may be marked as having an installation type of "request access" for one or more end users, meaning that the application is discoverable by those end users, but cannot be installed or launched by those end users until or unless a request to access the application is approved (e.g., by the IT administrator).

In some embodiments, there may be a notification engine within the desktop application management module that is configured to inform end users of upcoming application updates and newly available features. The notification engine may be accessed through the desktop application management module graphical user interface, or using other mechanisms, in different embodiments. For example, if the IT administrator has made new optional applications available for end users to subscribe to, they may be notified through the desktop application management module. As illustrated in FIG. 9A, the end user may have the option to view these notifications through the user interface of the desktop applications management module (e.g., using the "notifications" tab shown in FIG. 9A). For example, the end user may receive a notification when a new application is made available to the end user individually, is added to a catalog or portfolio of applications that are assigned or are otherwise available to the end user, or is added to the full application catalog, or when a new generation or version of an application to which the end user is currently subscribed is made available. In such embodiments, a notification alert may be indicated when and if a response to the end user's request to access work processing app C is posted with a notification service (such as notification service 258) by the backend service responsible for responding to the request (which, in this example, may be a desktop application fulfillment platform, such as desktop application fulfillment platform 208 in FIG. 2. For example, an actionable notification message may be posted by the desktop application fulfillment platform to an inbox that the user is authorized to access if and when the request is approved, and this actionable notification message may include links for multiple options for taking action in response to the approval.

FIG. 9B illustrates graphical user interface 900 of the desktop application manager when the end user has chosen to view the notifications that have been posted to inboxes that the end user is authorized to access. In this example, there is only one actionable notification message posted for this end user (e.g., only one notification that the end user is authorized to retrieve and/or act upon). This actionable notification message indicates that the end user's request to access word processing app C has been approved and include three available actions that the end user can take in response. In this example, selecting the action "install" may initiate a "create fulfillment" workflow on the desktop application fulfillment platform, selecting the action "cancel" may initiate a change of the state of this notification to "inactive", and selecting the action "later" may add the application to an intended state for the end user and/or may initiate a change of state for this notification to "temporarily inactive" or to some other intermediate state. In this example, since the user has selected "later", the next time the end user views this actionable notification message, it may include options to "cancel" the actionable notification message (as before) or to "reactivate" the actionable notification message.

Figure 10A:
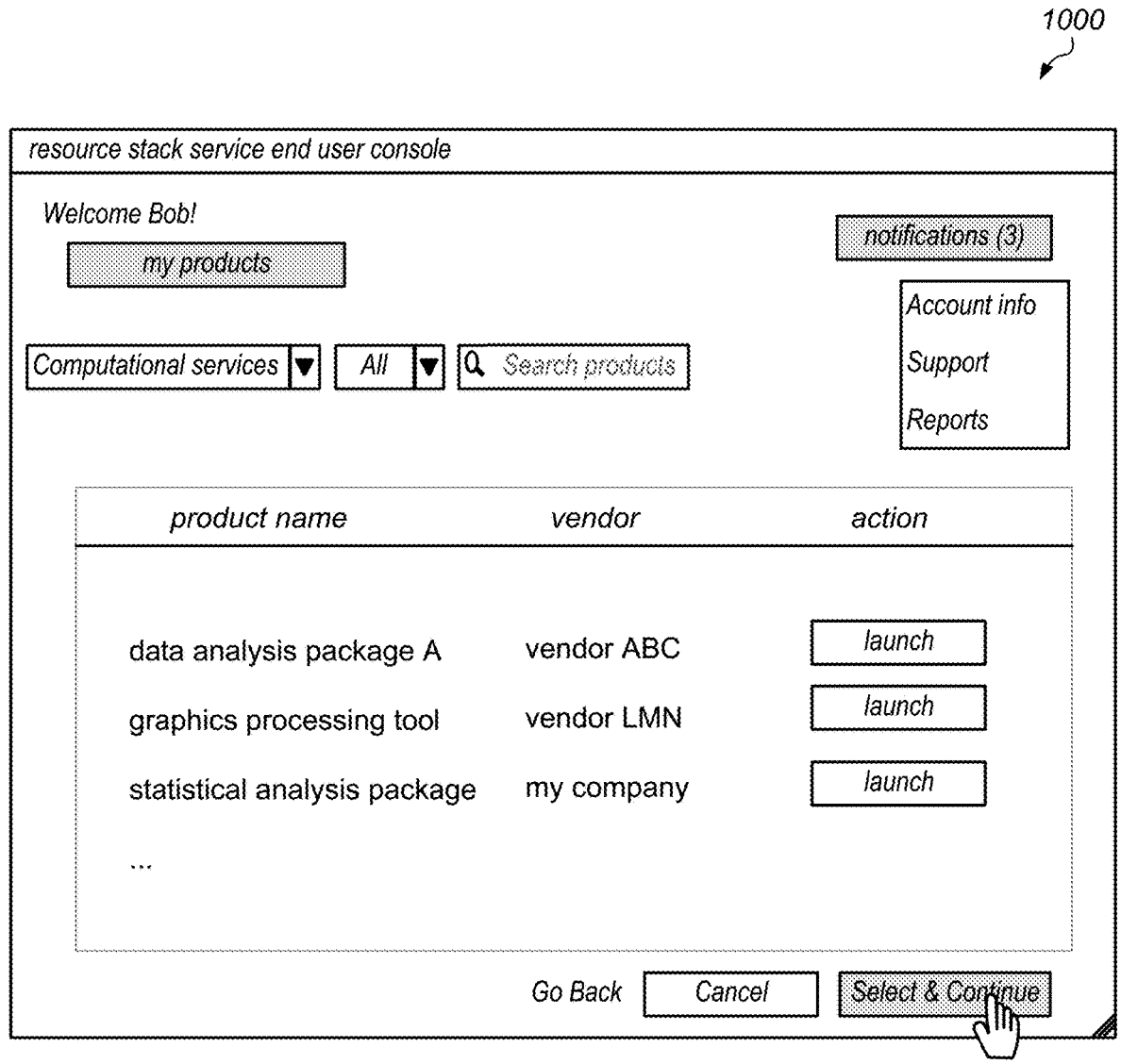
FIGS. 10A and 10B illustrate examples of the information presented to an end user through a graphical user interface of a resource stack management service console, according to at least some embodiments.

FIG. 10A illustrates an example of the information presented to an end user through a graphical user interface (GUI 1000) of a resource stack management service console (such as resource stack management service console 268 in FIG. 2), according to at least some embodiments. In this example, in response to selection of the "my products" tab near the top of the display, information may be presented to an end user who wishes to search for, select, and launch a service (e.g., a server product) that is managed by an enterprise catalog service (e.g., a service implemented by enterprise catalog service platform 206 in FIG. 2). More specifically, the end user has chosen to filter their search results by choosing "Computational services" from among multiple product type options (e.g., from a pull-down menu of such options). In this example, GUI 1000 also presents options for the end user to generate and/or view reports (e.g., server product deployment reports), and to view (and, in some cases, take action in response to) notifications.

The information presented in this example includes, in one portion of the display, a list of server products (e.g., server-type applications that execute on a service provider system on behalf of an end user and return a response), each of which may be constructed using a respective resource stack template, along with the vendors that developed or published the server products (or corresponding resource stack templates) and/or from which they were obtained, and user interface elements that may be selected if the end user would like to launch or update a particular one of the listed server products. In some embodiments, the end user may receive a notification when a new server product is made available to the end user individually or is added to a catalog or portfolio of server products that are assigned or are otherwise available to the end user, or when a new generation or version of a server product to which the end user is currently subscribed is made available. In addition, in some embodiments, a notification alert may be indicated in GUI 1000 when an actionable notification message to that effect or when a response to a request made by the end user for access to a new product is posted to an inbox that the end user is authorized to access in a notification service (such as notification service 258) by the backend service responsible for responding to the request (which, in this example, may be the resource stack management service).

Figure 10B:
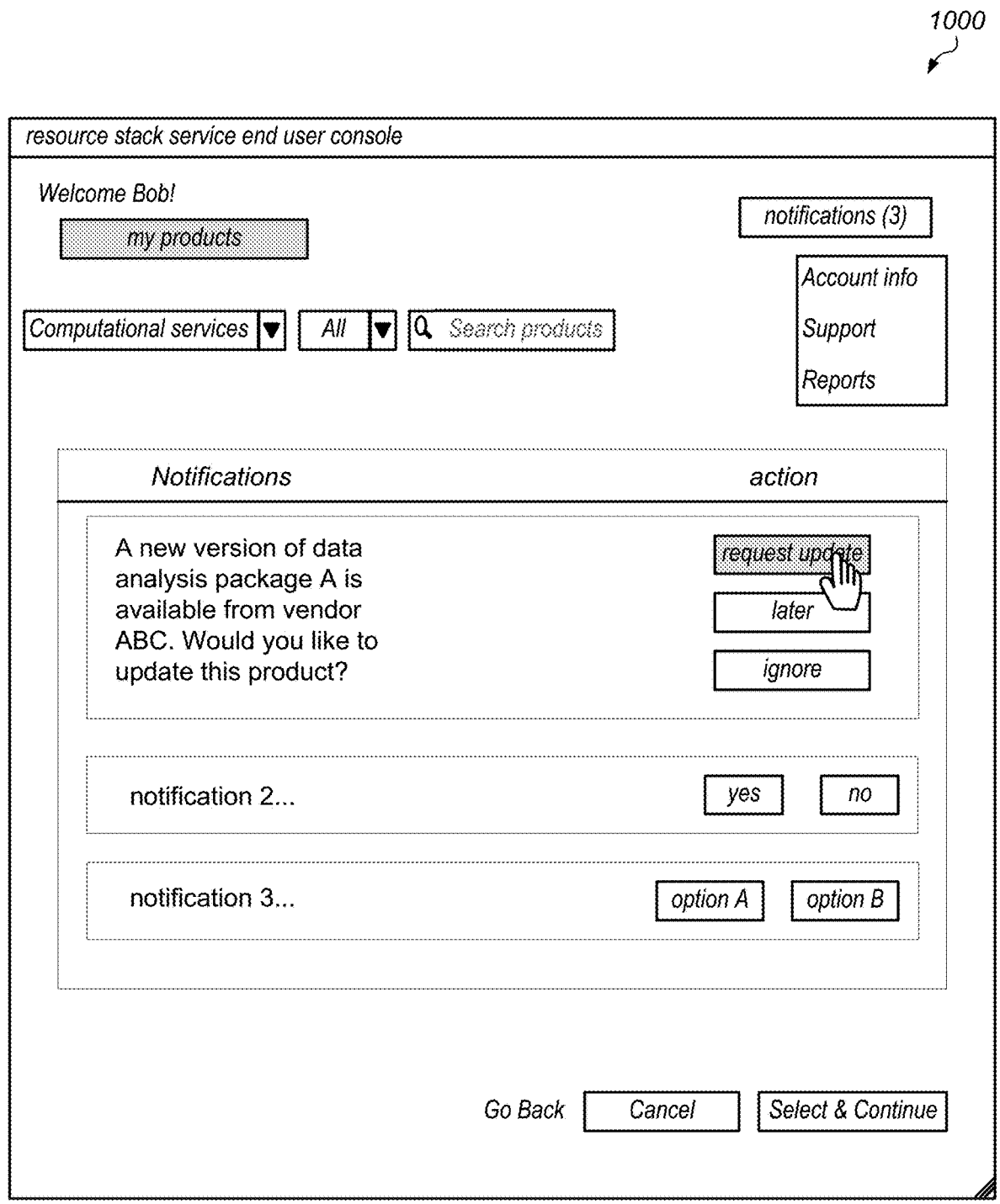

FIG. 10B illustrates graphical user interface 1000 of the resource stack management service console when the end user has chosen to view the notifications that have been posted to inboxes that the end user is authorized to access. In this example, there are three actionable notification messages posted for this end user (e.g., three notifications that the end user is authorized to retrieve and/or act upon), each of which includes actionable links for multiple options for taking action in response to the notification. The first of these actionable notification messages indicates that a new version of a product that the end user is currently subscribed to is available, and this actionable notification message includes multiple options for taking action in response to the approval. More specifically, the end user is presented with actionable options that include "request update" (which, if selected, may initiate an approval workflow and/or a product fulfilment/delivery workflow), "later" (which, if selected, may initiate a change of state for the actionable notification message to a "temporarily inactive" state), and "ignore" (which, if selected, may initiate a change of state for the actionable notification message to "delete"). In this example, the end user has chosen the action "request update". In addition to initiating various workflows, selection of this response may initiate a change of a state (by the backend service) to "inactive".

Figure 11:
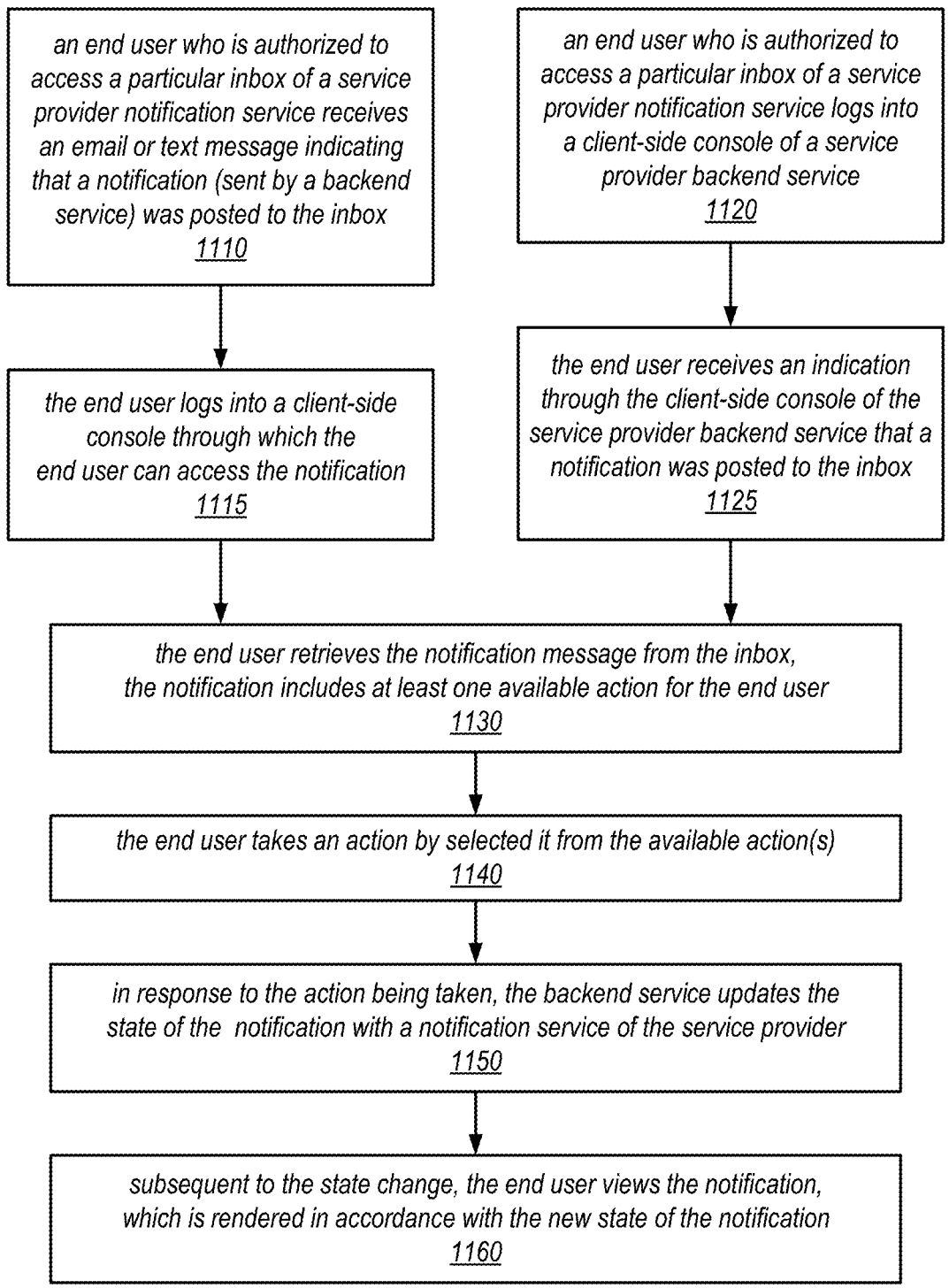
FIG. 11 is a flow diagram illustrating one embodiment of a method for an end user to handle an actionable notification message.

One embodiment of a method for an end user to handle an actionable notification message is illustrated by the flow diagram in FIG. 11. As illustrated at 1110, in this example, the method may include an end user who is authorized to access a particular inbox of a service provider notification service receiving an email or text message (e.g., an alert from an external messaging service) indicating that a notification (sent by a backend service through which the end user receives service) was posted to that inbox. In response to the alert, the method may include the end user logging into a client-side console of the backend service, the notification service, or another service through which the end user receives services from the service provider and through which the end user can access the notification, as in 1115.

Alternatively, the method may include an end user who is authorized to access a particular inbox of a service provider notification service logging into a client-side console of a service provider backend service through which the end user receives service, as in 1120. At some point subsequent to the end user logging into the client-side console of the service provider backend service, the method include the end user receiving an indication through the client-side console of the service provider backend service that a notification was posted to that inbox, as in 1125.

As illustrated in FIG. 11, regardless of the mechanism by which the end user is alerted to the existence of the notification, the method may include the end user retrieving the notification message from the inbox, and the notification may include at least one available action for the end user, as in 1130. The method may also include the end user taking an action by selected the action from among the available actions included in the actionable notification message, as in 1140. In response to the action being taken, method may include the backend service updating the state of the actionable notification message with the notification service of the service provider, as in 1150. At some point subsequent to the state change, the method may include the end user viewing the actionable notification message, which may be rendered in accordance with its new state, as in 1160.

Note that, in some embodiments, end users may (through various end user consoles such as consoles 264, 266, or 268 illustrated in FIG. 2, or through the selection of an action presented in an actionable notification message) be able to subscribe to a message topic (e.g., in order to request and receive push notifications for that topic). In some embodiments, end users (e.g., if authorized to do so by their IT administrators) may also be able to modify the configuration of an inbox, approve certain types of requests that are included in an actionable notification message or participate in an approval chain that is managed using actionable notification messages, or perform other tasks that would otherwise not be available to them.

Figure 12A:
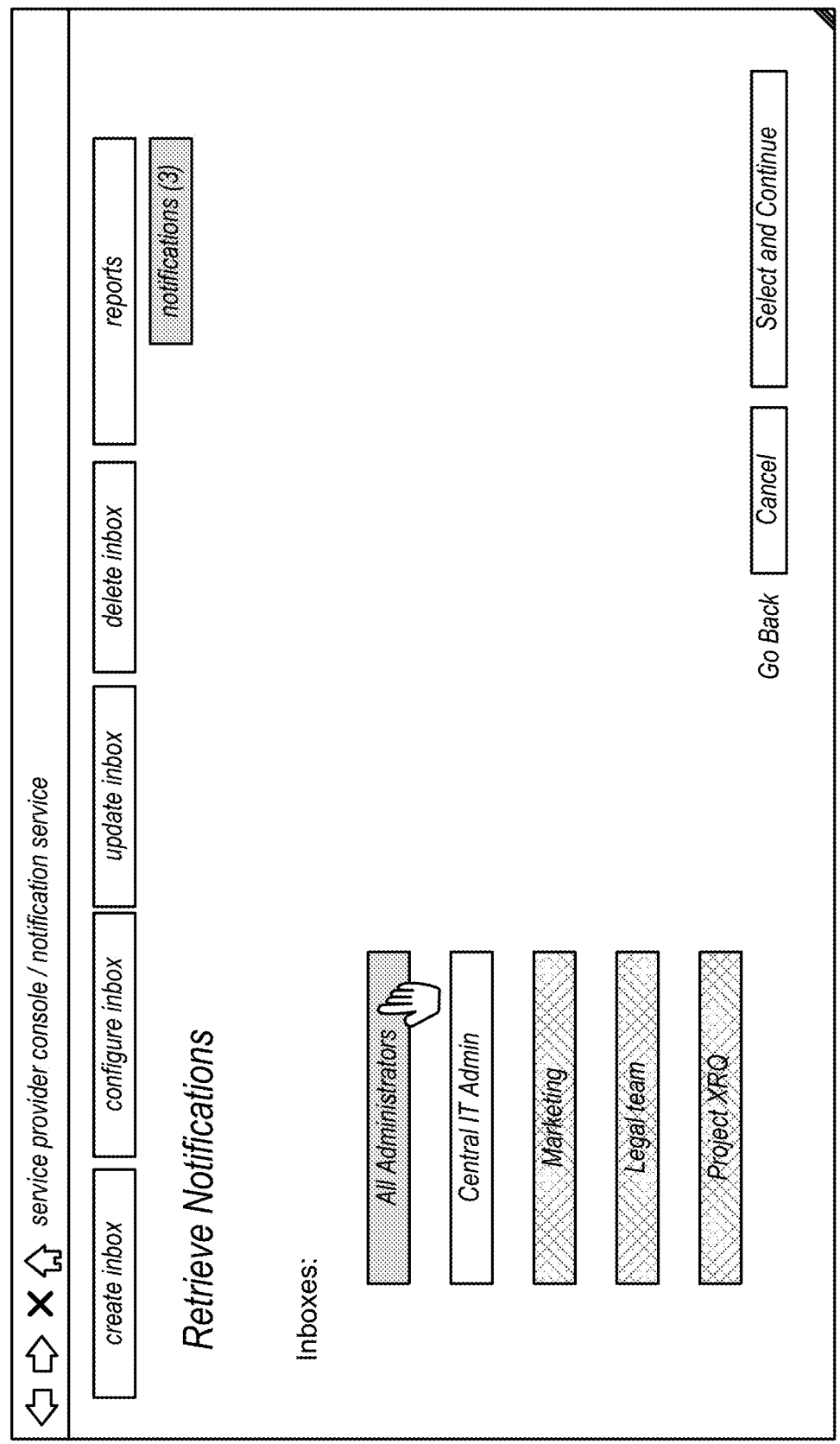
FIGS. 12A-12C illustrate examples of the information presented to an IT administrator through a graphical user interface of a service provider management console when retrieving and/or acting upon actionable notification messages that were posted to an inbox managed by a notification service, according to at least some embodiments.
Figure 12B:
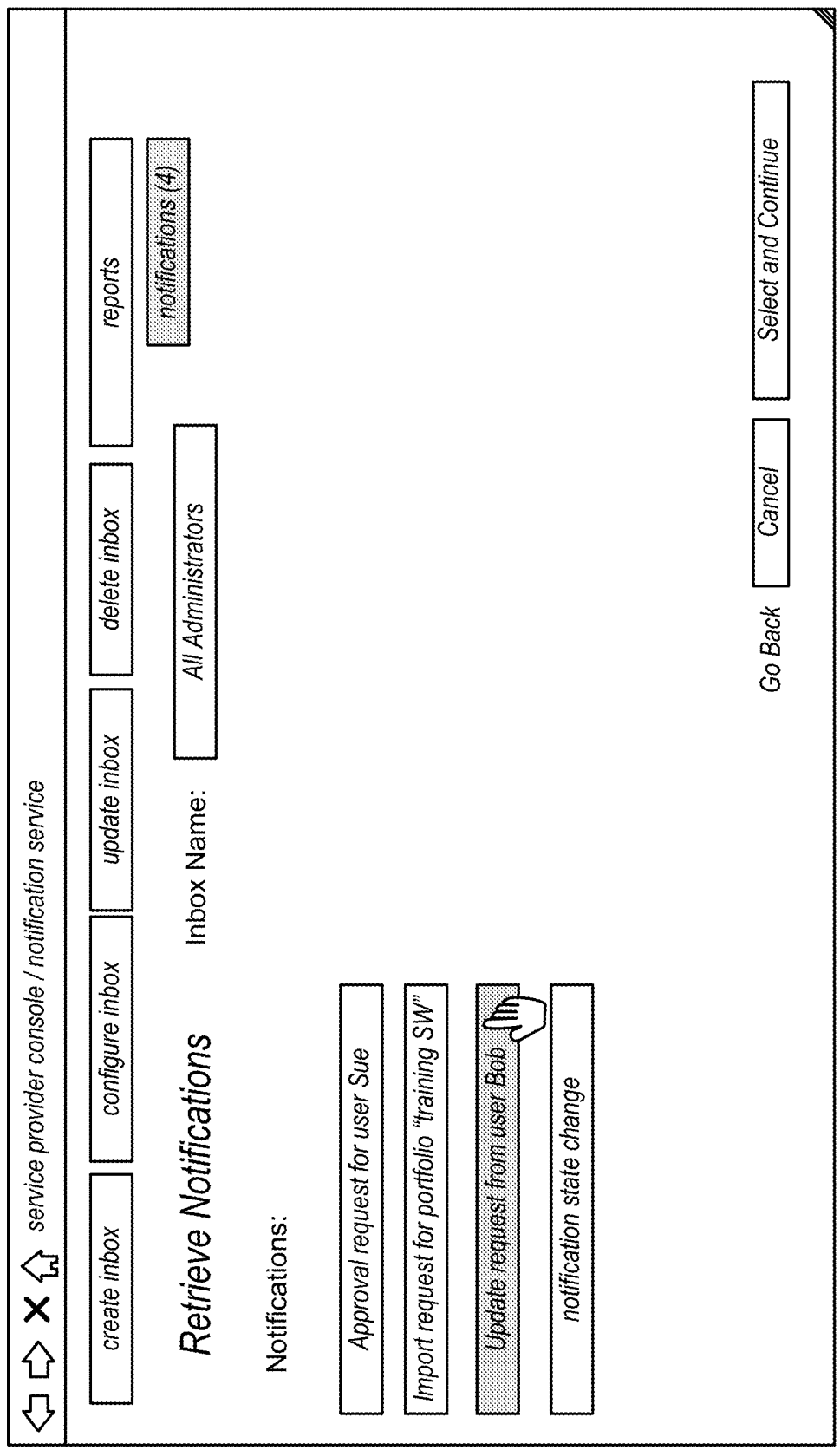
Figure 12C:
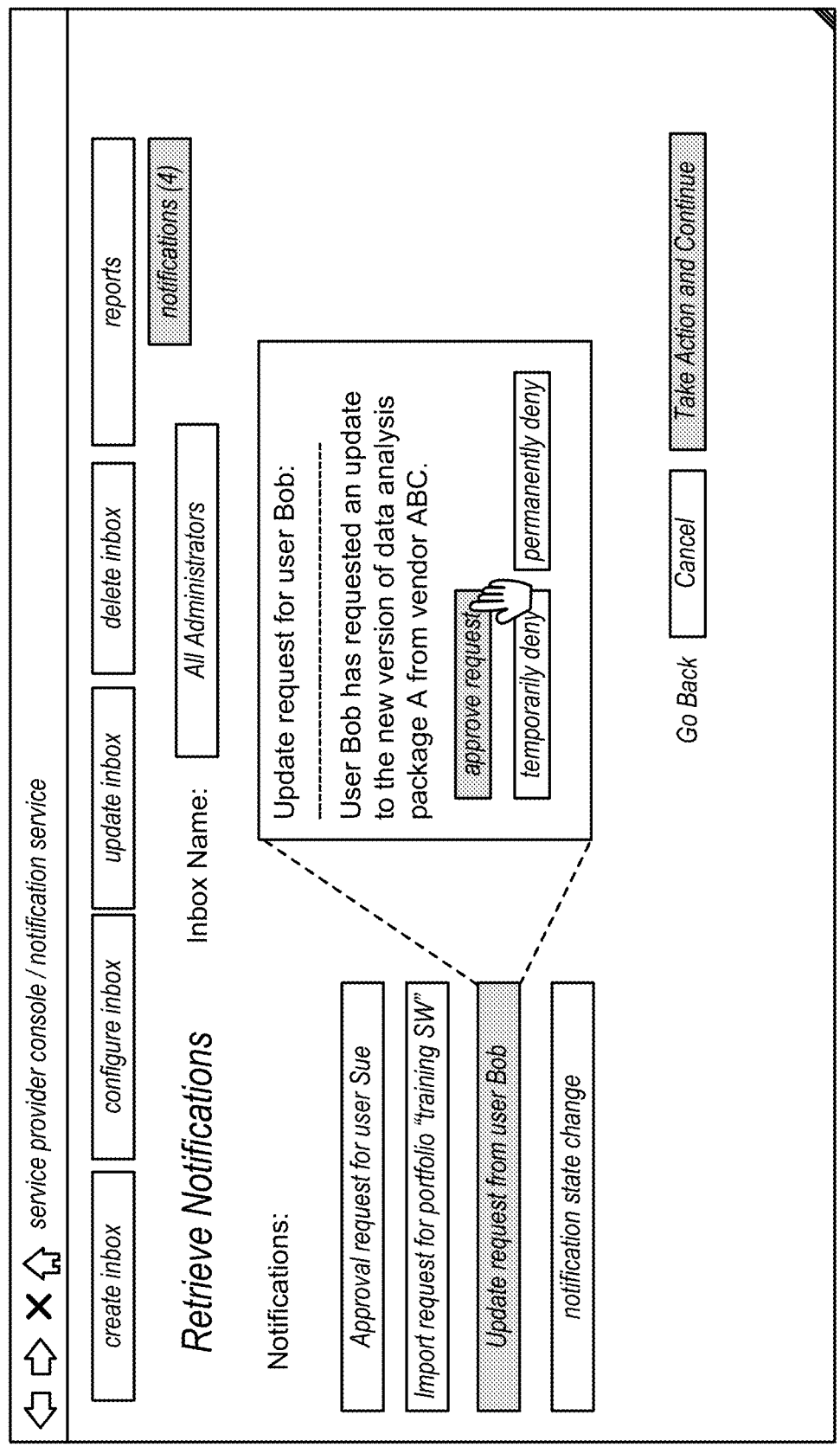

FIGS. 12A-12C illustrate examples of the information presented to an IT administrator through a graphical user interface of a service provider management console when retrieving and/or acting upon actionable notification messages that were posted to an inbox managed by a notification service, according to at least some embodiments. More specifically, FIG. 12A illustrates an example of the information presented to an IT administrator through a graphical user interface 1200 of a service provider management console when viewing actionable notification messages in an inbox managed by a notification service. Again note that the information presented to an IT administrator in GUI 1200 (e.g., when the IT administrator logs into the notification service through a service provider management console such as that illustrated in FIG. 2) may include different information and options than those presented to an end user who accesses the notification service (or various inboxes thereof). As illustrated in this example, in response to the IT administrator selecting the "notifications" tab near the top right corner of the display, the IT administrator may be presented with a list of inboxes that are managed by the notification service on behalf of the customer organization of which the IT administrator is a member (e.g., the current list of inboxes that have been created under the customer organization account, or the output of a ListInboxes API call). In this example, the user interface elements for inboxes "Marketing", "Legal team", and "Project XRQ" include hash marks and are not selectable by the IT administrator because the IT administrator does not have permission to access those inboxes. In this example, the IT administrator is authorized to access inboxes "All Administrators" and "Central IT Admin", and the user interface elements for these inboxes are selectable. Here, the IT administrator has selected the inbox "All Administrators". Once the IT administrator elects to "Select and Continue" as shown near the bottom right corner of GUI 1200, the IT administrator will be presented with additional information about the selected inbox.

FIG. 12B illustrates an example of the information presented to the IT administrator through GUI 1200 following the selection of the inbox "All Administrators", as in FIG. 12A. In this example, the IT administrator is presented with the current list of actionable notification messages in this inbox (e.g., the output of a ListMessages API call). In some embodiments, the messages may be sorted by date, with the most recently posted message being displayed first (at the top of the list). In this example, four actionable notification messages are included in the inbox: "Approval request for user Sue" (e.g., a request for access to a product that Sue is not currently authorized to receive), "Import request for portfolio 'training SW'" (e.g., an import request from an IT administrator who discovered it following its publication), "Update request from user Bob" (e.g., an update to receive a new version of a product, as described in reference to FIG. 10B), and "notification state change" (e.g., a message informing the IT administrator of a state change for a notification). Note that the "notification state change" message may not include any actions, or may include only an option to acknowledge receipt of the message, in different embodiments. In this example, there are no hash marks on any of the messages, indicating that, since the IT administrator is authorized to access this inbox, the IT administrator is also authorized to view and/or take action on any of the messages in the inbox. In this example, IT administrator has selected the message "Update request from user Bob". Once the IT administrator elects to "Select and Continue" as shown near the bottom right corner of GUI 1200, the IT administrator will be presented with additional information about the selected message.

FIG. 12C illustrates an example of the information presented to the IT administrator through GUI 1200 following the selection of the inbox "Update request from user Bob", as in FIG. 12B. In this example, the IT administrator is presented with a pop-up user interface element that includes the full content of the actionable notification message (e.g., the output of a DescribeMessage API call) and includes actionable links for three options for taking action in response to this notification. Note that these options are included in the message by the service that created and sent the notification, which, in this case, may be an approval service. In this example, the actionable notification message states, "User Bob has requested an update to the new version of data analysis package A from vendor ABC." In this example, the IT administrator is presented with actionable options that include "approve request" (which, if selected, may notify end user Bob that his request has been approved, initiate a product fulfilment/delivery workflow, and/or update the state of this actionable notification message to "inactive"), "temporarily deny" (which, if selected, may initiate a change of state for the actionable notification message to a "temporarily inactive" state, but may not update an intended state for the end user indicating that he cannot ever have access to the requested product version), and "permanently deny" (which, if selected, may initiate a change of state for the actionable notification message to a "delete" state, and may update an intended state for the end user indicating that he cannot ever have access to the requested product version). In this example, the end user has chosen the action "request update". Once the IT administrator elects to "Select and Continue" as shown near the bottom right corner of GUI 1200, the selected action may be performed.

Figure 13:
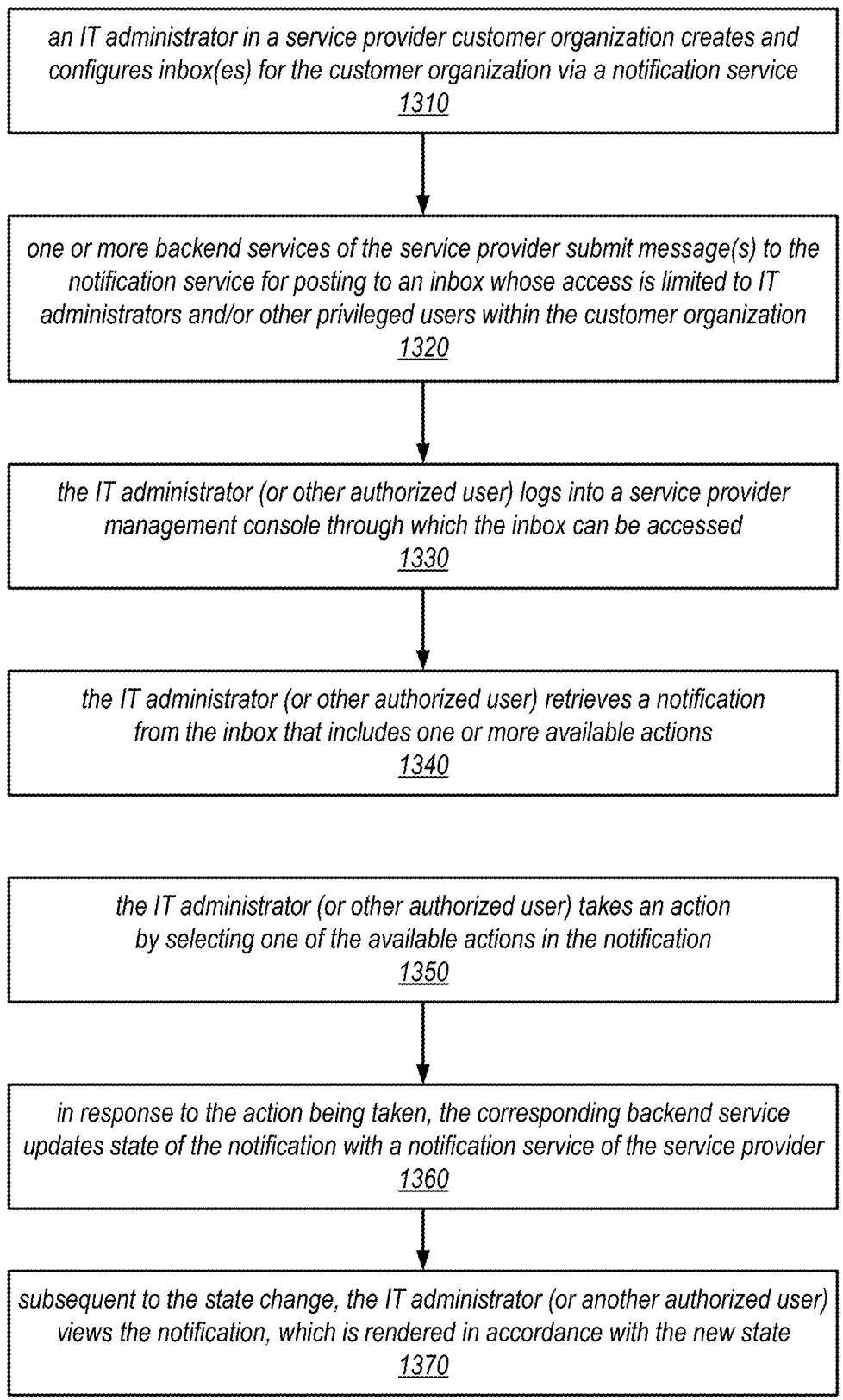
FIG. 13 is a flow diagram illustrating one embodiment of a method for an IT administrator to handle an actionable notification message.

One embodiment of a method for an IT administrator to handle an actionable notification message is illustrated by the flow diagram in FIG. 13. As illustrated at 1310, in this example, the method may include an IT administrator in a service provider customer organization creating and configuring one or more inboxes for the customer organization via a notification service. The method may include one or more backend services of the service provider through which the through which the customer organization receives service submitting one or more actionable notification messages to the notification service for posting to an inbox whose access is limited to IT administrators and/or other privileged users within the customer organization, as in 1320.

At some point subsequent to the creation and configuration of the inbox and one or more actionable notification messages being posted, the method may include the IT administrator (or other authorized user) logging into a service provider management console through which the inbox can be accessed, as in 1330. The method may also include the IT administrator (or other authorized user) retrieving a notification message from the inbox that includes one or more available actions, as in 1340.

As illustrated in FIG. 13, the method may include the IT administrator (or other authorized user) taking an action by selecting one of the available actions in the actionable notification message, as in 1350. In response to the action being taken, the method may include the corresponding backend service (e.g., the backend service that created the actionable notification message) updating the state of the notification with the notification service of the service provider, as in 1360. At some point subsequent to the state change, the method may include the IT administrator (or another authorized user) viewing the actionable notification message, which may be rendered in accordance with its new state, as in 1370.

Note that, in other embodiments, the graphical user interfaces illustrated in FIGS. 3, 4, 8A-8B, 9A-9B, 10A-10B, and 12A-12C may include more, fewer, or different elements that those illustrated and described herein. Note also that the user interface elements included in the graphical user interfaces illustrated in FIGS. 3, 4, 8A-8B, 9A-9B, 10A-10B, and 12A-12C and described herein may, in other embodiments, take different forms (e.g., as menus items, icons, radio buttons, text boxes, check boxes, or other user interface element types) and/or may be arranged in a different order or in different positions within the GUI than the order or positions in which they are arranged in FIGS. 3, 4, 8A-8B, 9A-9B, 10A-10B, and 12A-12C.

Example Provider Network Environment

This section describes an example provider network environment in which embodiments of the methods described herein may be implemented. However, this example provider network environment is not intended to be limiting. In various embodiments, in such provider network environments, a service provider may host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

In some embodiments, desktop applications that are included in catalogs managed by an enterprise catalog service such as those described herein may be delivered to and/or deployed, installed or executed on virtualized computing resources (e.g., virtual computing resource instances implemented on service provider hardware in a cloud computing environment), rather than on physical client computing devices. In addition, server products that are included in catalogs managed by an enterprise catalog service may be implemented as resource stacks (e.g., stacks of service provider resources) that collectively provide a service. These service provider resources may also include virtualized computing resources, such a virtual computing node instances implemented on service provider hardware in a cloud computing environment. In various embodiments, such virtualized computing resources may be employed in implementing the notification services described herein. For example, the notification service and/or any of the backend services that are customers of the notification service may execute on virtualized computing resources in a cloud computing environment for the benefit of various customer organizations and their end users. An example service provider network that provides virtualized computing resources for these and other uses is illustrated in FIG. 14 and described below.

Figure 14:
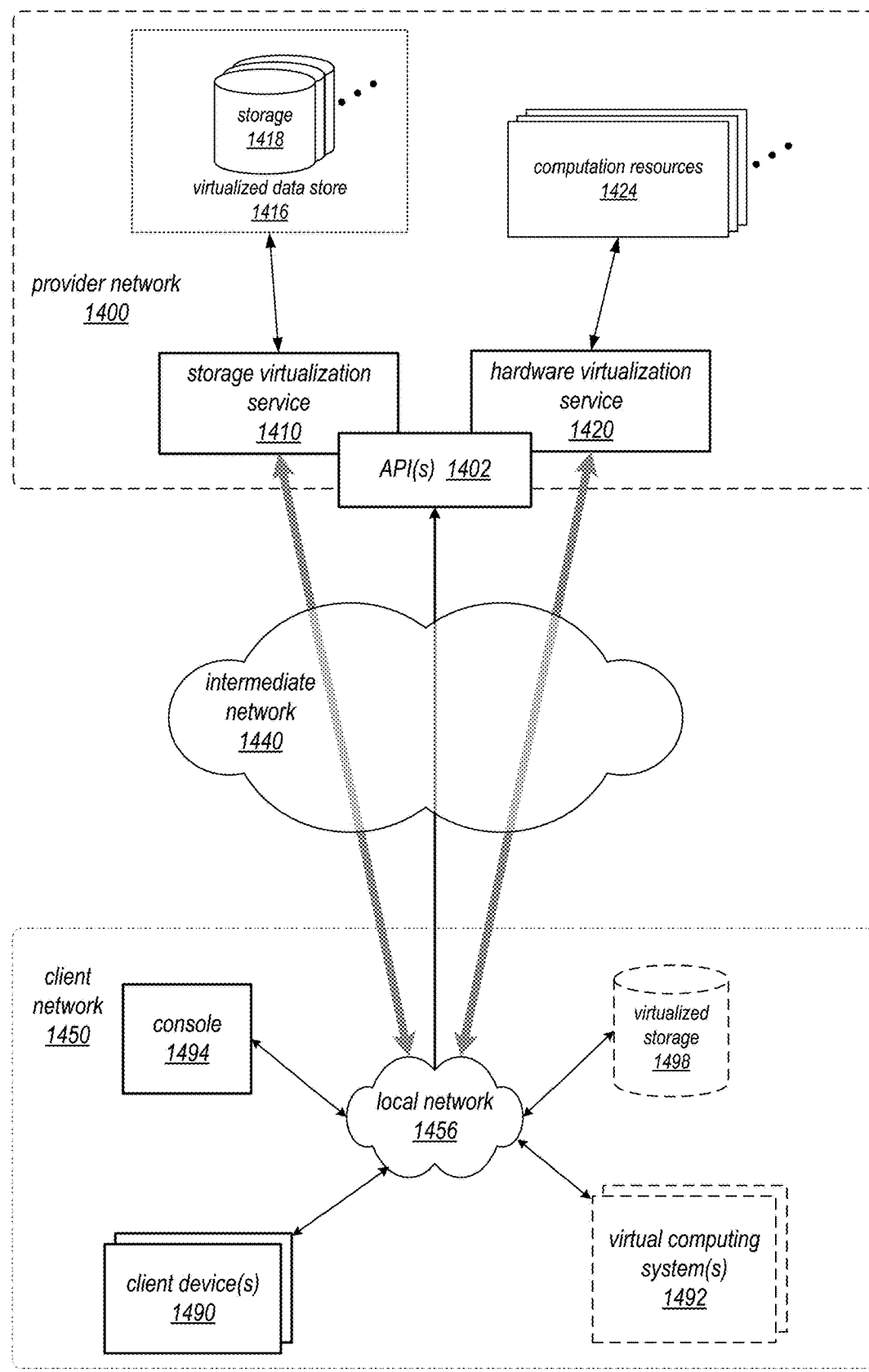
FIG. 14 is a block diagram illustrating an example provider network that provides a storage virtualization service and a hardware virtualization service to clients, according to at least some embodiments.

FIG. 14 is a block diagram of an example provider network environment, one that provides a storage virtualization service and a hardware virtualization service to clients, according to at least some embodiments. In this example, hardware virtualization service 1420 provides multiple computation resources 1424 (e.g., VMs) to clients. The computation resources 1424 may, for example, be rented or leased to clients of the provider network 1400 (e.g., to a client that implements client network 1450). As noted in the previous example, in some embodiments, provider network 1400 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 1400. In this example, each computation resource 1424 may be provided with one or more private IP addresses. Provider network 1400 may be configured to route packets from the private IP addresses of the computation resources 1424 to public Internet destinations, and from public Internet sources to the computation resources 1424.

Provider network 1400 may provide a client network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a client network 1450 may access functionality provided by the hardware virtualization service 1420, for example via a console 1494. In at least some embodiments, at the provider network 1400, each virtual computing system 1492 at client network 1450 may correspond to a computation resource 1424 that is leased, rented, or otherwise provided to client network 1450.

From an instance of a virtual computing system 1492 and/or another client device 1490 or console 1494, the client may access the functionality of storage virtualization service 1410, for example via one or more APIs 1402, to access data from and store data to a virtual data store 1416 provided by the provider network 1400. In some embodiments, a virtualized data store gateway (not shown) may be provided at the client network 1450 that may locally cache at least some data, for example frequently accessed or critical data, and that may communicate with virtualized data store service 1410 via one or more communications channels to upload new or modified data from a local cache so that the primary store of data (virtualized data store 1416) is maintained. In at least some embodiments, a user, via a virtual computing system 1492 and/or on another client device 1490, may mount and access one or more storage volumes 1418 of virtual data store 1416, each of which appears to the user as local virtualized storage 1498.

While not shown in FIG. 14, the virtualization service(s) may also be accessed from resource instances within the provider network 1400 via API(s) 1402. For example, a client, appliance service provider, or other entity may access a virtualization service from within a respective private network on the provider network 1400 via an API 1402 to request allocation of one or more resource instances within the private network or within another private network. Note that in some embodiments, the hardware virtualization service 1420 may be configured to provide computation resources 1424 that have been configured to implement a virtual desktop instance, which may appear to the user as a local desktop (implemented by a virtual computing system 1492). Note also that in some embodiments, the computation resources 1424 that are made available to the client via hardware virtualization service 1420 may include multiple network interfaces. For example, some of them may include one network interface for communicating with various components of client network 1450 and another network interface for communicating with computation resources or other network entities on another network that is external to provider network 1400 (not shown).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients. In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances, and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual desktop environment. Although the virtual desktop environment is implemented by virtualized resource instances in the cloud computing environment, it may appear to the end user as if it were a local desktop and it may operate as if it were an independent computer to which the user is connected. In some embodiments, the virtual desktop environment may provide access to productivity software and other software programs to which the user would typically have access if the user were logged onto a physical computer owned by the organization or enterprise. In at least some embodiments, an application fulfillment platform of the service provider may be configured to provide on-demand delivery of applications (e.g., as virtualized application packages) to virtual desktop instances, as described herein. Note that these applications may or may not be stand-alone applications. For example, in some cases, each of the virtual desktop instances (and/or the applications running thereon) may be part of the active directory framework of the organization or enterprise and may be able to access shared files or other resources on the existing network of the organization or enterprise once the credential presented by the user upon logging into the virtual desktop instance have been authenticated.

Illustrative System

Figure 15:
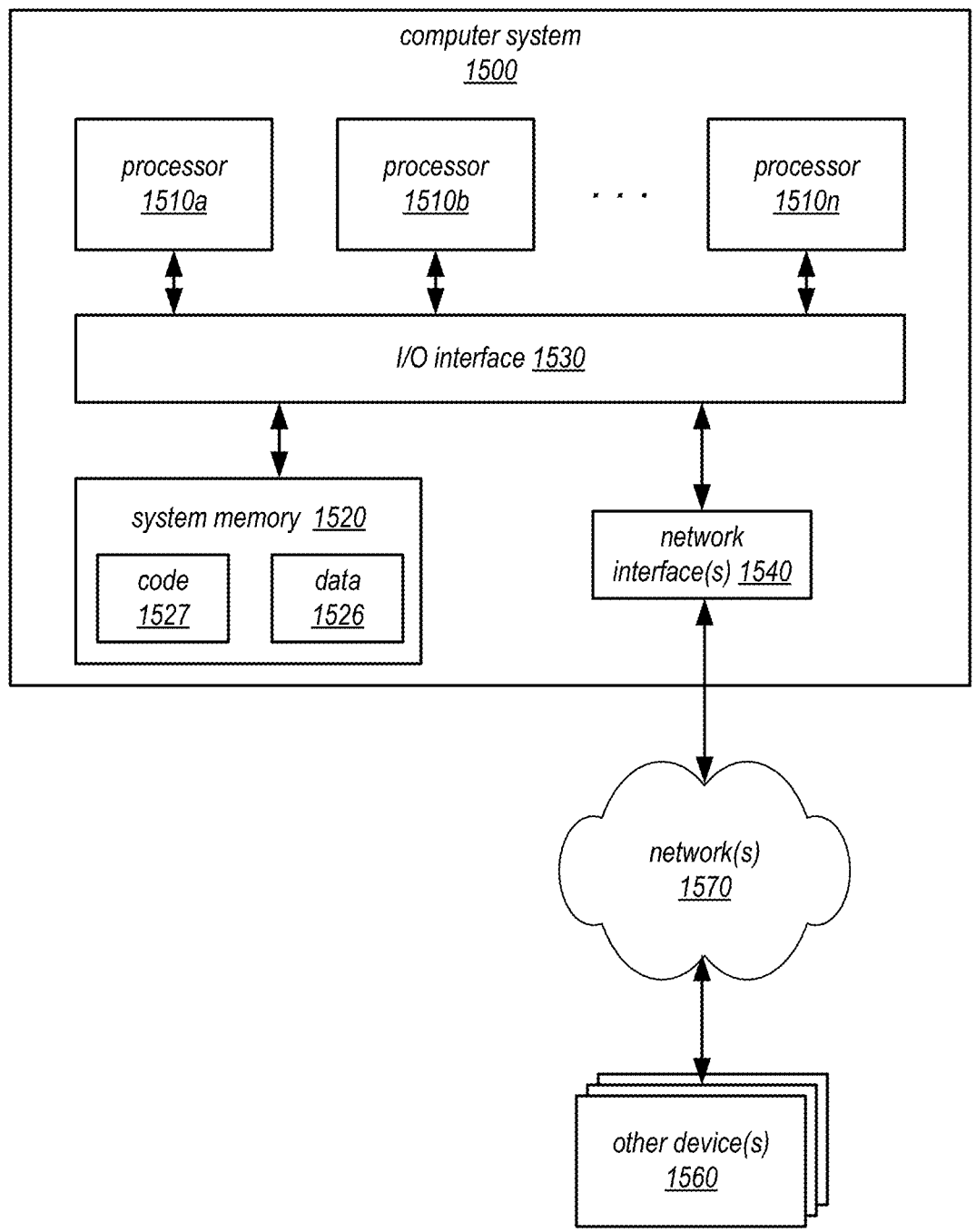
FIG. 15 is a block diagram illustrating an example computer system that implements some or all of the techniques described herein, according to different embodiments.

In at least some embodiments, a server that implements some or all of the techniques for managing actionable notification messages (e.g., to receive, store, dispatch, update, and/or otherwise manage actionable notification messages that are received from any of a variety of backend services), as described herein, may include a general-purpose computer system that includes or is configured to access a non-transitory computer-accessible (e.g., computer-readable) media, such as computer system 1500 illustrated in FIG. 15. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, virtual desktop instances, catalog services, product fulfillment services and/ or any other services to customers or customer organizations; or client computing devices or other components on a client network) may be implemented using a computer system similar to computer system 1500 that has been configured to provide the functionality of those components. In the illustrated embodiment, computer system 1500 includes one or more processors 1510 coupled to a system memory 1520 via an input/output (I/O) interface 1530. Computer system 1500 further includes one or more network interfaces 1540 coupled to I/O interface 1530. In some embodiments, network interfaces 1540 may include two or more network interfaces (including, e.g., one configured for communication between a virtualized computing resource hosted on the computer system 1500 and its clients, and one configured for communication between a virtualized computing resource and external resources, computing systems, data centers, or Internet destinations on networks other than the provider network and a client network on whose behalf the virtualized computing resources are hosted. In other embodiments, network interface(s) 1540 may be a single network interface.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store instructions and data accessible by processor(s) 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for managing actionable notification messages, are shown stored within system memory 1520 as code 1525 and data 1526. For example, data 1526 may include information representing message inboxes, inbox configuration information, actionable notification messages, templates for rendering actionable notification messages, software products, virtualized application packages, resource stack templates, the assignment of selected software products to particular end users and/or user groups, constraints and/or configuration parameter settings for the selected software products, users, and catalogs or portfolios, usage data, billing information, various types of metadata that is maintained for particular software products, unique resource identifiers for products and portfolios (e.g., portfolio keys) and/or information about who a portfolio has been shared with and/or imported by, and/or any other information usable in managing and deploying desktop applications and services, any of which may be stored in any of a variety of data structures or database tables within memory 1520 on one or more computing nodes of a service provider system and/or client computing device used in managing actionable notification messages as described herein.

In one embodiment, I/O interface 1530 may be configured to coordinate I/O traffic between processor 1510, system memory 1520, and any peripheral devices in the device, including any of network interface(s) 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface(s) 1540 may be configured to allow data to be exchanged between computer system 1500 and other devices 1560 attached to a network or networks 1550, such as other computer systems or devices as illustrated in the figures, for example. In various embodiments, network interface(s) 1540 may support communication via any suitable wired or wireless general data networks, such as types of Ethernet network, for example. Additionally, network interface(s) 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-accessible medium configured to store program instructions and data as described above for implementing various embodiments of the techniques for managing actionable notification messages described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 1500 via I/O interface 1530. A non-transitory computer-accessible (e.g., computer-readable) storage medium may also include any volatile or non-volatile media such as RAM (e.g. SDRAM, DDR SDRAM, RDRAM, SRAM, etc.), ROM, etc., that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface(s) 1540.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a plurality of computing nodes that collectively provide services to an organization that is a customer of a service provider, each of the computing nodes comprising at least one processor and a memory, wherein one or more of the plurality of computing nodes implement a notification service; and
   an administrator interface, implemented by one or more same or other of the plurality of computing nodes of the service provider, through which an administrator within the customer organization interacts with the notification service, implemented by the one or more computing nodes of the service provider, to manage actionable notification messages from one or more backend services provided to the customer organization by the service provider, wherein the actionable notification messages comprise respective active message elements to cause a respective action to be performed responsive to being selected;
   wherein the notification service is configured to:
   receive, through the administrator interface, a request from the customer organization to create a message inbox maintained by the service provider, wherein the request comprises an identifier of the message inbox;
   create the message inbox, wherein creating the message inbox comprises configuring data storage resources to store a plurality of actionable notification messages;
   receive, from one of the one or more backend services, an actionable notification message, wherein the actionable notification message comprises the identifier of the message inbox, and a plurality of active message elements that when selected by an authorized recipient of the actionable notification message cause a respective action to be performed;
   post the actionable notification message to the message inbox;
   receive, from the one of the backend services, a request to change state information for the posted actionable notification message, wherein the requested change is dependent on which of the plurality of active message elements was selected by an authorized recipient of the actionable notification message; and
   modify the posted actionable notification message to reflect the requested change received from the one of the backend services.

2. The system of claim 1,
   wherein, subsequent to posting the actionable notification message to the message inbox, the notification system is further configured to initiate the sending of an alert message to the authorized recipient of the actionable notification message through a message system that is provided by an entity other than the service provider; and
   wherein the alert indicates that an actionable notification message has been posted to the message inbox.

3. The system of claim 1, wherein, when posting the actionable notification message to the message inbox, the notification service is further configured to render the actionable notification message for subsequent display to the authorized recipient through an end user interface of the notification service of the backend service.

4. The system of claim 1, wherein the request to create the message inbox further comprises an identity and access management policy that governs one or more of:
   which members of the customer organization are authorized recipients of the actionable notification messages stored in the message inbox, wherein authorized recipients have permission to view actionable notification messages stored in the message inbox; or
   which members of the customer organization are authorized to cause an action to be performed by selecting one of the plurality of active message elements included in the actionable notification message.

5. The system of claim 1,
   wherein the notification service is configured to:
   receive, through the administrator interface, a request to update the message inbox, wherein the request comprises a request to modify a configuration parameter of the message inbox or a request to delete the message inbox; and
   modify the configuration parameter of the message inbox or delete the message inbox, as indicated in the request to update the message inbox.

6. A method, comprising:
   performing, by one or more computers of a service provider that implement a notification service:
   maintaining, by the one or more computers of the service provider on behalf of a customer of the notification service, a message inbox, wherein the message inbox stores one or more actionable notification messages, wherein the one or more actionable notification messages are retrievable by one or more authorized recipients of the notification service customer, and wherein an authorized recipient is a notification service consumer having permission to access the message inbox;

receiving, from a different service, an actionable notification message, wherein the actionable notification message comprises at least one active message element that when selected by an authorized recipient of the actionable notification message causes a corresponding action to be performed;

storing the actionable notification message in the message inbox;

receiving, from the different service and subsequent to storing the actionable notification message in the message inbox, input indicating a change of state for the stored actionable notification message; and modifying the actionable notification message that is stored in the message inbox to reflect the change of state indicated from the input received from the different service.

7. The method of claim 6, wherein the actionable notification message comprises two or more active message elements that, when selected by an authorized recipient of the actionable notification message, causes a corresponding action to be performed; and wherein the change of state is dependent on which of the two or more active message elements was selected by an authorized recipient of the actionable notification message.

8. The method of claim 6, wherein the different service is a service that is distinct from the notification service and that is provided to the customer by the service provider.

9. The method of claim 6, wherein the different service is a service that is provided to the customer by an entity other than the service provider.

10. The method of claim 6, further comprising:

receiving, from a third service, an actionable notification message; and storing the actionable notification message that was received from the third service in the message inbox.

11. The method of claim 6, wherein the actionable notification message comprises an identifier of the message inbox; and wherein the method further comprises:

maintaining, on behalf of the customer, a second message inbox, wherein the second message inbox stores one or more actionable notification messages, wherein the one or more actionable notification messages stored in the second message inbox are retrievable only by authorized recipients of the messages stored in the second message inbox, wherein an authorized recipient of the messages stored in the second message inbox is a notification service consumer having permission to access the second message inbox; and wherein the authorized recipients of the messages stored in the message inbox and the authorized recipients of the messages stored in the second message inbox include at least one different recipient;

receiving, from the different service, a second actionable notification message, wherein the second actionable notification message comprises an identifier of the second message inbox; and storing the second actionable notification message in the second message inbox.

12. The method of claim 11, wherein each actionable notification message received by the notification service is directed to the one of the message inboxes indicated by the message inbox identifier included in the actionable notification message dependent on one or more of: the source of the actionable notification message, a message type for the actionable notification message, a target recipient for the actionable notification message, or a message topic associated with the actionable notification message.

13. The method of claim 6, wherein the customer is a customer organization that consumes services provided by the service provider, including the notification service and the different service; and wherein the method further comprises:

receiving, from an administrator within the customer organization, a request to create the message inbox on behalf of the customer organization, wherein the request to create the message inbox comprises an identifier of the message inbox and information indicating that one or more members of the customer organization are authorized recipients of messages stored in the message inbox.

14. The method of claim 6, wherein the method further comprises:

rendering, prior to receiving the input indicating a change of state for the actionable notification message, the actionable notification message for subsequent presentation to one or more authorized recipients; and wherein modifying the actionable notification message that is stored in the message inbox to reflect the change of state comprises re-rendering the actionable notification message for subsequent presentation to the one or more authorized recipients;

wherein the rendering and the re-rendering are dependent, at least in part, on a message type for the actionable notification message and the state of the actionable notification message at the time of the rendering or re-rendering.

15. The method of claim 6, wherein the different service comprises a notification service, a desktop application fulfillment service, a resource stack management service, a storage service, a database service, or a virtualized computing resource service.

16. The method of claim 6, wherein the actionable notification message comprises a request for approval to take an action, a request to access a resource, a request to access a service, an indication of the availability of a new resource or resource version, a response to a request submitted on behalf of the customer, a push notification for a resource or service, or a sunset notification for a resource or service.

17. A non-transitory computer-readable storage medium storing program instructions that when executed on one or more computers cause the one or more computers to implement a notification service, wherein the notification service is configured to:

present an administrator interface through which an administrator within a customer organization interacts with the notification service to manage actionable notification messages that are received from another service on behalf of the customer organization, wherein the customer organization is a consumer of the other service;

receive, via the interface, input from the administrator within the customer organization initiating an operation to create a message inbox on behalf of the customer organization;

create the message inbox on behalf of the customer organization, wherein the message inbox is maintained by the notification service;

receive, from the other service, one or more actionable notification messages;

store the one or more actionable notification messages to the message inbox for subsequent retrieval by one or more authorized recipients of the one or more actionable notification messages;

receive, on behalf of a given one of the one or more authorized recipients through an end user interface through which the given authorized recipient interacts with the notification service, a request to retrieve one of the one or more stored actionable notification messages received from the other service, wherein the request comprises an identifier of the one of the one or more stored actionable notification messages;

present, through the end user interface, the one of the one or more stored actionable notification messages received from the other service, by presenting one or more active user interface elements, wherein each of the one or more active user interface elements represents an action to be performed automatically in response to its selection by the given authorized recipient of the stored actionable notification message;

subsequent to presenting, through the end user interface, the one of the one or more stored actionable notification messages received from the other service, receive, from the other service, an update for the one of the one or more stored actionable notification messages; and modify the one of the one or more stored actionable notification messages to reflect the update received from the other service.

18. The non-transitory computer-readable storage medium of claim 17, wherein the notification service is further configured to implement an application programming interface that defines a plurality of method calls through which the other service interacts with the notification service;

wherein each of the one or more actionable notification messages received from the other service is received via a method call of the application programming interface for submitting an actionable notification message to the notification service; and wherein another method call of the application programming interface is usable by the other service to submit an update for an actionable notification message that was previously submitted to the notification service.

19. The non-transitory computer-readable storage medium of claim 17, wherein the notification service is further configured to implement an application programming interface that defines a plurality of method calls through which the end user interface interacts with the notification service on behalf of the given authorized recipient; and wherein the request to retrieve the one of the one or more actionable notification messages is received via a method call of the application programming interface for retrieving an actionable notification message from the notification service.

20. The non-transitory computer-readable storage medium of claim 17, wherein the notification service is further configured to:

determine that one or more actionable notification messages stored in the message inbox should be deleted from the message inbox; and delete the one or more actionable notification message from the message inbox;

wherein to determine that one or more actionable notification messages stored in the message inbox should be deleted from the message inbox, the notification service is configured to determine:

that a limit on the number of actionable notification messages that can be stored in the message inbox has been met;

that a limit on the number of actionable notification messages that can be stored on behalf of the customer organization has been met;

that a maximum duration for an actionable notification message has been met;

that a state of an actionable notification message indicates that the actionable notification message is no longer relevant; or that a request has been submitted by the other service or by the administrator indicating that an actionable notification should be deleted.

* * * * *